(12) United States Patent
Tabata et al.

(10) Patent No.: US 8,460,435 B2
(45) Date of Patent: Jun. 11, 2013

(54) APPARATUS FOR PRODUCING HIGH-CONCENTRATION OZONE GAS AND METHOD OF PRODUCING HIGH-CONCENTRATION OZONE GAS

(75) Inventors: Yoichiro Tabata, Tokyo (JP); Yujiro Okihara, Tokyo (JP); Tetsuya Saitsu, Tokyo (JP); Noriyuki Nakamura, Tokyo (JP); Ryohei Ueda, Tokyo (JP); Koji Ota, Tokyo (JP); Yasuhiro Tanimura, Tokyo (JP)

(73) Assignees: Toshiba Mitsubishi-Electric Industrial Systems Corporation, Tokyo (JP); Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 12/745,595

(22) PCT Filed: Nov. 28, 2008

(86) PCT No.: PCT/JP2008/071705
§ 371 (c)(1),
(2), (4) Date: Oct. 21, 2010

(87) PCT Pub. No.: WO2009/069774
PCT Pub. Date: Jun. 4, 2009

(65) Prior Publication Data
US 2011/0052483 A1    Mar. 3, 2011

(30) Foreign Application Priority Data
Nov. 30, 2007    (JP) .................................. 2007-311121

(51) Int. Cl.
*C01B 13/10* (2006.01)
*B01D 53/04* (2006.01)

(52) U.S. Cl.
USPC ............. 95/138; 96/121; 96/131; 422/186.08

(58) Field of Classification Search
USPC ...... 96/121, 131; 95/95, 96, 138; 422/186.07, 422/186.08; 423/581
See application file for complete search history.

(56) References Cited

U.S. PATENT DOCUMENTS 2,872,397 A    2/1959    Kiffer
4,371,380 A    2/1983    Benkmann
(Continued)

FOREIGN PATENT DOCUMENTS

EP    0 757 970 A1    2/1997
EP    0 792 835 A1    9/1997
(Continued)

OTHER PUBLICATIONS

Extended European Search Report issued Aug. 14, 2012, in Application No. / Patent No. 08853608.1-1270 / 2236459 PCT/JP2008071705.
(Continued)

*Primary Examiner* — Frank Lawrence, Jr.
(74) *Attorney, Agent, or Firm* — Oblon, Spivak, McClelland, Maier & Neustadt, L.L.P.

(57) ABSTRACT

An apparatus for producing high-concentration ozone gas has a plurality of adsorption/desorption columns and a plurality of valves capable of switching opening/closing of the passage of gas flowing into or out of the adsorption/desorption columns, such that each of the adsorption/desorption columns can performs ozone adsorption processing, evacuation processing or desorption processing. At least two of the adsorption/desorption columns are placed in a serial cycle arrangement to constitute a main adsorption/desorption column group, and one or more of the other adsorption/desorption columns is placed in parallel with the main adsorption/desorption column group to constitute an auxiliary adsorption/desorption column. The auxiliary adsorption/desorption column performs desorption processing during a period in which none of the adsorption/desorption columns of the main adsorption/desorption column group is performing desorption processing.

12 Claims, 14 Drawing Sheets

U.S. PATENT DOCUMENTS

| | | | | |
|---|---|---|---|---|
| 4,863,497 A | * | 9/1989 | Grenier et al. | 96/123 |
| 5,520,887 A | * | 5/1996 | Shimizu et al. | 422/186.08 |
| 5,730,783 A | * | 3/1998 | Sanui et al. | 95/115 |
| 5,888,271 A | * | 3/1999 | Tanimura et al. | 95/12 |
| 6,030,598 A | * | 2/2000 | Topham et al. | 423/581 |
| 6,254,763 B1 | | 7/2001 | Izumi et al. | |
| 6,344,130 B1 | * | 2/2002 | Koike et al. | 205/626 |
| 6,916,359 B2 | * | 7/2005 | Jain | 95/99 |
| 8,029,603 B2 | * | 10/2011 | Weist, Jr. | 95/96 |
| 2003/0145727 A1 | * | 8/2003 | Murai | 95/138 |

FOREIGN PATENT DOCUMENTS

| | | |
|---|---|---|
| EP | 1 101 732 A1 | 5/2001 |
| JP | 50 116390 | 9/1975 |
| JP | 63 159202 | 7/1988 |
| JP | 11 292514 | 10/1999 |
| JP | 2000 72408 | 3/2000 |

OTHER PUBLICATIONS

U.S. Appl. No. 12/743,984, filed May 20, 2010, Ota, et al.

* cited by examiner

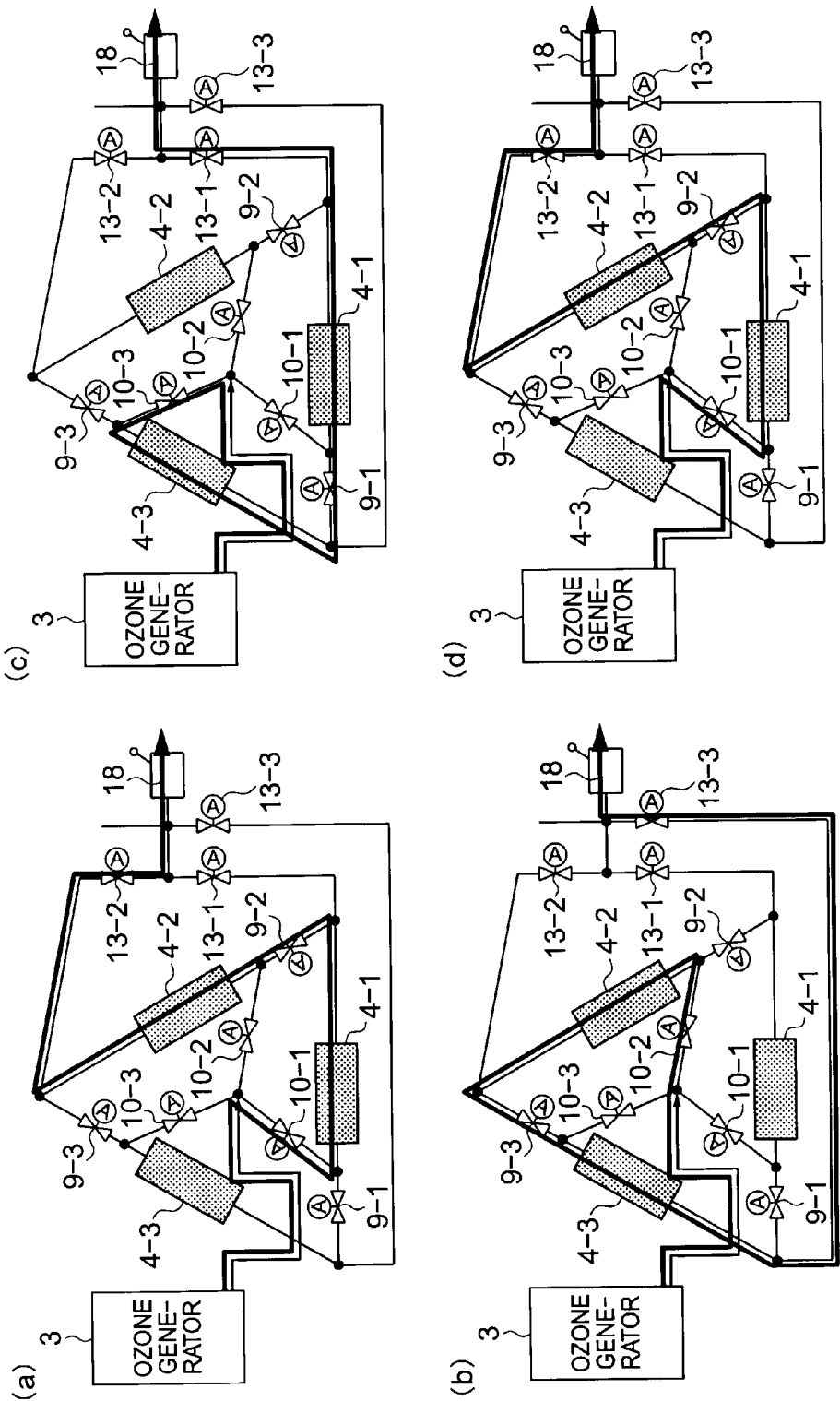

ated gas part into 100% ozonized gas of 50 Torr (53 hPa)
APPARATUS FOR PRODUCING HIGH-CONCENTRATION OZONE GAS AND METHOD OF PRODUCING HIGH-CONCENTRATION OZONE GAS

TECHNICAL FIELD

The present invention relates to an apparatus for producing high-concentration ozone gas and a method of producing high-concentration ozone gas. In particular, the present invention relates to an apparatus for producing high-concentration ozone gas and a method of producing high-concentration ozone gas by selectively concentrating ozonized oxygen gas with silica gel (adsorbs ozone) to gasify the concentrated ozone, thereby generating high-concentration ozone.

BACKGROUND ART

Recently, ozone has been used for a variety of purposes such as the oxidation of ozone for forming an oxide film used in a semiconductor device, the ozone cleaning of a silicon wafer used in a semiconductor device, and water supply and sewerage treatment, and the like. The oxidation of ozone of a silicon wafer requires an oxide film of high quality, and hence, there is a demand for high-purity and high-concentration ozonized gas.

Further, in the ozone cleaning, ozone water obtained by dissolving ozonized gas in pure water is used as a cleaning solution, an organic substance and noble metal on a silicon wafer are removed by using the ozone water together with dilute hydrofluoric acid aqueous solution or the like.

In a semiconductor production field, in order to realize a more highly integrated semiconductor, each manufacturer is performing research and development competitively. Therefore, for example, the following is stated: in the step of producing a non-volatile semiconductor memory device (non-volatile memory) in which a silicon oxide film is formed on a nitrogen film of a silicon wafer, a control gate electrode and a floating gate electrode are formed of a very thin oxide film with a thickness of about 2 nm, and as means for forming an oxide film capable of suppressing a leakage current between layers, an oxide film of good quality can be formed by a low-temperature oxidation chemical reaction caused by 20 vol % (440 g/Nm3) or more of ultra-high-purity ozonized gas containing no impurities other than oxygen and ozonized gas and the irradiation with UV-rays and plasma discharge, whereby an oxide film satisfying the above-mentioned thickness and the prescription of suppressing a leakage current can be realized (for example, see Patent Document 1). In the semiconductor production field, in order to realize high integration, the formation of an oxide film of better quality is becoming important. Therefore, the technology enabling continuously supply of 20 vol % (440 g/Nm3) or more of ultra-high-purity ozonized gas, i.e., high-concentration ozonized gas in a large amount economically and safely.

It is difficult to store ozonized gas in a state of the ozonized gas as it is due to the strong self-decomposition property thereof, and the ozonized gas is generally generated for use by an ozone generator in the vicinity of an ozone-using facility.

As an apparatus for producing ozonized gas having high-concentration of 20% or more of a conventional example, there are two methods: an ozone adsorption method of allowing an adsorbent to adsorb ozonized gas and to desorb the adsorbed ozone, and an ozone liquefying method of liquefying ozonized gas to vaporize liquefied ozone.

In the technology of the ozone adsorption system, there is a method including an adsorption step of allowing an adsorbent cooled by a refrigerating machine to saturation-adsorb ozonized gas generated by an ozone generator in an atmospheric state, a purification step of discharging, under a reduced pressure, an adsorption/desorption column containing the adsorbent to a partial pressure of supply ozonized gas, and an elimination step of supplying ozone of high concentration with a pressure difference by communicating the ozone to an ozone-using facility kept in a vacuum state, while keeping a cooled state and a reduced-pressure state in the adsorption/desorption column (for example, see Patent Document 2).

Further, in another technology of the ozone adsorption system, the following method has been proposed: an ozone generator and three adsorption/desorption columns filled with an adsorbent are provided in parallel with each other, a gas piping configuration for supplying the ozonized gas (about 10 vol % (220 g/Nm3 or less)) in parallel to the three adsorption/desorption columns, a refrigerating machine for cooling (to −60° C.) the adsorption columns, a heater for controlling the temperature of the adsorption/desorption columns, an open/close valve for changing an ozone passage, an ozone storage container for storing desorbed ozone, and a mass-flow controller for adjusting the flow rate of ozone to be supplied from the ozone storage container to an ozone-using facility are provided, and four steps of an ozone adsorption step, a stabilizing and boosting step, an ozone desorption step, and a cooling step are repeated in time series in each of the three adsorption/desorption columns provided in parallel with each other while being shifted by ⅓ cycle to generate ozone of a concentration of 28.4 vol % continuously from the three adsorption/desorption columns (for example, see Patent Document 3).

Further, in a conventional discharge-type ozone generator, several % of nitrogen is mixed in oxygen gas to stabilize the generation of ozone (for example, see Patent Document 4).

In the technology of the ozone liquefying method, a refrigerating machine is cooled to a temperature at which ozone is liquefied, ozonized gas is supplied to the refrigerating machine to allow the ozonized gas to be liquefied selectively in the refrigerating machine, and the liquefied ozone is vaporized in the refrigerating machine in the subsequent step, whereby the ozonized gas is concentrated highly.

In a conventional apparatus for producing ultra-high-concentration ozone gas using the technology of the ozone liquefying method, ozonized gas (oxygen 90%-ozone 10%) generated from an ozone generator of about 10 vol % (220 g/Nm3) or less is supplied to a chamber cooled to 80 K (−193° C.) to 100 K (−173° C.) to liquefy only the ozonized gas, a gas part in the chamber is evacuated in a discharging device part in the subsequent step, the ozonized gas liquefied in the further subsequent step is heated with a heater to a temperature around 128 K (−145° C.) to 133 K (−140° C.) to form the evacuated gas part into 100% ozonized gas of 50 Torr (53 hPa) to 70 Torr (100 hPa) corresponding to a vapor pressure of ozone, and the evaporated ozone is taken out (for example, see Patent Document 5).

Patent Document 1: JP 2005-347679 A
Patent Document 2: JP 2002-68712 A
Patent Document 3: JP 11-335102 A
Patent Document 4: JP 2001-180915 A
Patent Document 5: JP 2001-133141 A

DISCLOSURE OF THE INVENTION

Problem to be Solved by the Invention

FIG. 10 is a schematic structural view of an adsorption/desorption column 1 of an adsorption/desorption system. In the figure, reference numeral 4 denotes an adsorption/desorption column in a column shape, 6 denotes an ozone adsorbent for adsorbing ozonized gas, C0 denotes the ozone concentration of ozone to be supplied, and C denotes the ozone concentration of ozone to be discharged.

As illustrated in FIG. 10, generally, in the case where the ozone adsorbent 6 is packed, ozonized gas of a predetermined ozone concentration C0 is supplied to the cooled adsorption/desorption column 4, and the ozonized gas is adsorbed selectively, there are the following problems: it takes a long time for the adsorbent in the adsorption column to selectively adsorb the ozonized gas in a saturated manner, and further, ozonized gas that cannot be adsorbed in an adsorption step needs to be discharged, which degrades an ozone adsorption efficiency, and a very large ozone-discharging facility is required in the treatment of the discharged ozonized gas.

According to the high-concentration ozone output system of an adsorption/desorption system, when the ozonized gas of the ozone concentration C0 is supplied to the adsorption column 4 illustrated in FIG. 10, first, the adsorbent adsorbs the initially supplied ozonized gas completely within a predetermined period of time, and almost 100% of ozonized gas can be adsorbed selectively. The above-mentioned predetermined period of time in which the state where the ozonized gas can be adsorbed completely corresponds to a period (time) in which ozone is adsorbed by a conical volume denoted by reference symbol 6A in the content packed with the ozone adsorbent 6 illustrated in FIG. 10. The volume of 6A corresponds to ⅓ of the volume of the packed adsorbent 6, and in order to allow the remaining ⅔ ozone adsorbent 6 to adsorb ozone and the ozone adsorbent 6 in the column to adsorb the ozone in a saturated manner up to nearly 100% ability, it is necessary to discharge the ozonized gas that cannot be adsorbed outside the column while the ⅔ ozone adsorbent 6 adsorbs the ozone. Therefore, it is necessary to enhance an adsorption efficiency $\eta 1$, which is ozone to be adsorbed with respect to the supplied ozonized gas amount.

Further, there is required the step of removing the ozonized gas in the column from the adsorbed ozone to increase the concentration. Generally, the concentration is increased by reducing the pressure of the adsorbed ozone with a vacuum pump or the like. Even in the step of removing the ozonized gas in the column (step of reducing pressure in vacuum), the ozonized gas needs to be discharged. Therefore, in order to allow the high-concentration ozonized gas to be output, it is necessary to enhance the pressure reduction efficiency $\eta 2$ even in the step of reducing pressure in vacuum.

The ozonized gas output efficiency $\eta$ of the apparatus for producing high-concentration ozone gas is mainly determined by the above-mentioned adsorption efficiency $\eta 1$ and the pressure reduction efficiency $\eta 2$.

Ozonized gas output efficiency $\eta$=(Adsorption efficiency $\eta 1$)·(Pressure reduction efficiency $\eta 2$)

Therefore, a problem to be solved by the present invention is to provide an apparatus for producing high-concentration ozone gas and a method of producing high-concentration ozone gas, in which the above-mentioned ozonized gas output efficiency $\eta$ is enhanced, high-concentration ozonized gas can be output in a large amount, high-purity ozonized gas containing no impurity gas can be provided continuously, and an apparatus (system) can be made compact.

Prior to the description of the present invention, an example in which adsorption characteristics of ozonized gas are measured is illustrated in FIG. 11.

In FIG. 11, reference numeral 444 denotes concentration characteristics of ozone discharged from the adsorption/desorption column 4 in a test apparatus. The discharge concentration of a part of the ozone adsorbed by the adsorption/desorption column 4 increases gradually from a time when about 20 minutes has elapsed, and ozone with the same concentration as that of supplied ozone is discharged in about 120 minutes (reference numeral 445), and the adsorption/desorption column 4 cannot adsorb ozone any more.

That is, a region of a frame 555 denotes an ozone supply amount, and a region 666 denotes a saturated ozone adsorbed amount. A region 777 denotes a discharged ozone amount. An adsorption efficiency $\eta 1$ is obtained to be about 30% from the regions 666 and 777. Further, if the adsorption time is set to be 50 minutes (reference numeral 445A) in order to enhance the adsorption efficiency $\eta 1$, the adsorption efficiency $\eta 1$ can be enhanced up to about 60%.

Further, the pressure reduction efficiency $\eta 2$ can be enhanced by improvement measures based on design to be only about 50 to 70%.

Therefore, the ozonized gas output efficiency $\eta$ of the apparatus for producing high-concentration ozone gas is about 40% under good conditions.

Further, in the case where only one adsorption/desorption column 4 is provided, in order to allow high-concentration ozone to be output, there are required at least three steps: the step of adsorbing ozone (adsorption step); the step of increasing a concentration (pressure reduction step); and the step of outputting high-concentration ozone (desorption step) as described above. Therefore, it is impossible to supply high-concentration ozone continuously (high-concentration ozone is not output between the adsorption step and the pressure reduction step).

In the technology of producing high-concentration ozonized gas, as illustrated in the above-mentioned Patent Documents 3 and 5, the ozonized gas generated by the ozone generator is cooled, and the ozonized gas is liquefied or adsorbed by an adsorbent in the first step, and the gas that cannot be adsorbed is discharged to vacuum in the second step, and thereafter, further, the liquefied or adsorbed gas is heated in the third step, whereby high-concentration ozonized gas of about 100% ozone or 95% ozone is obtained. Therefore, there are the following problems in terms of the apparatus.

In a conventional apparatus for producing high-concentration ozone gas of an ozone adsorption system, in order to increase the amount of high-concentration ozonized gas to be taken out or to prolong a time for taking out high-concentration ozonized gas, it is necessary to allow the adsorbent in each adsorption/desorption column to adsorb ozonized gas up to about 100% of the adsorbing ability to enhance the concentration efficiency of ozone. When the adsorbing ability of an ozone adsorbent is enhanced, in the ozone adsorption step, ozonized gas needs to be adsorbed until the adsorption is completed and the discharge gas discharged from an adsorption/desorption column reaches the concentration of ozone to be supplied to the adsorption/desorption column. That is, when the adsorbing ability of the ozone adsorbent is enhanced, the concentration of ozone of the discharge gas discharged from the adsorption/desorption column is also increased, and the amount of ozonized gas to be supplied is increased to degrade an adsorption efficiency.

Further, when the adsorption efficiency is degraded, the amount of ozonized gas to be supplied from the ozone generator needs to be increased, which makes it necessary to enlarge the ozone generator, resulting in an increase in cost of the ozone generator. Further, when the amount of ozone of the discharge gas discharged from the adsorption/desorption column is increased, an ozonized gas decomposer for decomposing ozone of discharge gas needs to be enlarged, resulting in an increase in cost of the ozonized gas decomposer.

There is also a problem that, because the cooling step is provided after the stabilizing and boosting step and the desorption step, there is a time loss other than that for adsorption/desorption, and a temperature difference occurs at upper and lower positions of the adsorption/desorption columns, which increases an energy loss.

In the case where ozone is generated from material gas mixed with nitrogen to generate a nitrogen oxide, whereby the concentration of ozone is increased, the concentration of the nitrogen oxide is also increased (the nitrogen oxide is concentrated) simultaneously. Thus, there is a problem that corrosion may be caused in an ozone-using facility.

In a conventional apparatus for producing high-concentration ozone gas of an ozone liquefying system, liquefied ozone liquid and ozone adsorbing to an ozone adsorbent is heated to be evaporated. Therefore, if the liquefied ozone solution and the ozone adsorbing to the ozone adsorbent is heated rapidly, the liquefied ozone solution and adsorbed ozone are vaporized rapidly to increase a gas pressure dramatically, which causes the possibility of explosion. Therefore, it is necessary to avoid rapid evaporation and to evaporate the ozone solution and the adsorbed ozone at a low pressure. Consequently, the flow rate of concentrated ozonized gas to be obtained cannot be increased, and only concentrated ozonized gas at a low pressure is supplied, mass-processing (batch processing) cannot be performed in the semiconductor production field, and concentrated ozonized gas cannot be dispersed equally to a wafer treatment chamber.

Further, there are the following problems: ozone is liquefied to a predetermined content and adsorbed by an ozone adsorbent once to about 100%; the ozonized gas generated by the ozone generator is allowed to flow into a liquefying chamber or an adsorption chamber continuously; the gas that cannot be liquefied and the ozonized gas that cannot be adsorbed are discarded to a discharge ozone apparatus; and the ozonized gas cannot be concentrated efficiently.

The present invention has been achieved in order to solve such problems, and its object is to provide an apparatus for producing high-concentration ozone gas and a method of producing high-concentration ozone gas, in which the amount of ozone that can be adsorbed by an ozone adsorbent is increased compared with the conventional apparatus, the amount of ozone of discharge gas discharged from an adsorption/desorption column is decreased, high-concentration ozonized gas containing no impurity gas can be provided continuously, the adsorbing ability of an ozone adsorbent in an adsorption/desorption column can be enhanced, and the adsorption efficiency of the apparatus is enhanced, whereby an ozone generator for supplying ozonized gas and an ozone decomposer are reduced in size and cost.

Means for Solving the Problems

The present invention relates to an apparatus for producing high-concentration ozone gas, including: an ozone generator; a plurality of adsorption/desorption columns packed with an ozone adsorbent for adsorbing ozone of ozonized gas generated by the ozone generator; gas supply means for allowing the ozonized gas generated by the ozone generator to flow into the plurality of adsorption/desorption columns; a vacuum pump for discharging oxygen from the ozone adsorbent that has adsorbed the ozone in the adsorption/desorption columns; output means for allowing the ozonized gas, a concentration of which is increased when the oxygen in the adsorption/desorption columns is discharged, to flow out of the adsorption/desorption columns; and a plurality of open/close valves capable of switching opening/closing of the passage of gas which is allowed to flow into or flow out of the adsorption/desorption columns, in which: each of the adsorption/desorption columns performs ozone adsorption processing of allowing the ozone adsorbent to adsorb, at a low temperature of 0° C. or less, ozonized gas which is generated by the ozone generator and has a predetermined concentration exceeding an atmospheric pressure, evacuation processing of discharging oxygen from the ozone adsorbent which has absorbed ozone, and desorption processing of outputting the ozonized gas that is highly concentrated with oxygen being discharged therefrom by vacuum desorption or heating desorption; at least three of the plurality of adsorption/desorption columns are placed in a serial cycle to constitute a main adsorption/desorption column group; one or more of the plurality of adsorption/desorption columns other than the at least three of the plurality of adsorption/desorption columns is placed in parallel with the main adsorption/desorption column group to constitute an auxiliary adsorption/desorption column; and in a period in which none of the at least three of the plurality of adsorption/desorption columns of the main adsorption/desorption column group is performing desorption processing, the auxiliary adsorption/desorption column performs desorption processing.

Effects of the Invention

The present invention relates to an apparatus for producing high-concentration ozone gas, including: an ozone generator; a plurality of adsorption/desorption columns packed with an ozone adsorbent for adsorbing ozone of ozonized gas generated by the ozone generator; gas supply means for allowing the ozonized gas generated by the ozone generator to flow into the plurality of adsorption/desorption columns; a vacuum pump for discharging oxygen from the ozone adsorbent that has adsorbed the ozone in the adsorption/desorption columns; output means for allowing the ozonized gas, a concentration of which is increased when the oxygen in the adsorption/desorption columns is discharged, to flow out of the adsorption/desorption columns; and a plurality of open/close valves capable of switching opening/closing of the passage of gas which is allowed to flow into or flow out of the adsorption/desorption columns, in which: each of the adsorption/desorption columns performs ozone adsorption processing of allowing the ozone adsorbent to adsorb, at a low temperature of 0° C. or less, ozonized gas which is generated by the ozone generator and has a predetermined concentration exceeding an atmospheric pressure, evacuation processing of discharging oxygen from the ozone adsorbent which has absorbed ozone, and desorption processing of outputting the ozonized gas that is highly concentrated with oxygen being discharged therefrom by vacuum desorption or heating desorption; at least three of the plurality of adsorption/desorption columns are placed in a serial cycle to constitute a main adsorption/desorption column group; one or more of the plurality of adsorption/desorption columns other than the at least three of the plurality of adsorption/desorption columns is placed in parallel with the main adsorption/desorption column group to constitute an auxiliary adsorption/desorption column; and in a period in which none of the at least three of the plurality of adsorption/desorption columns of the main adsorption/desorption column group is performing desorption processing, the auxiliary adsorption/desorption column performs desorption processing. Therefore, the amount of ozone that can be adsorbed by an ozone adsorbent is increased compared with a conventional apparatus, the amount of ozone of discharge gas discharged from the adsorption/desorption columns is decreased. Further, high-purity ozonized gas containing no impurity gas can be provided continuously, the adsorbing ability of the ozone adsorbent in the adsorption/desorption columns can be enhanced, and the adsorption efficiency of the apparatus is enhanced, whereby the ozone generator for supplying ozonized gas and the ozone decomposer can be reduced in size and cost.

BRIEF DESCRIPTION OF THE DRAWINGS

[FIG. 1A] An explanatory view illustrating a portion of a main adsorption/desorption column group in FIG. 1, which illustrates a flow of ozone gas at a time of adsorption in a serial cycle arrangement in the case of three columns.

BEST MODE FOR CARRYING OUT THE INVENTION

The present invention relates to an apparatus for producing high-concentration ozone gas and a method of producing high-concentration ozone gas, in which ozonized oxygen gas at an atmospheric pressure exceeding one is supplied, ozone is selectively concentrated with silica gel (ozone is adsorbed) at a low temperature of 0° C. or less and a high atmospheric pressure, and the concentrated ozone is gasified at a low temperature of 0° C. or less in vacuum, whereby high-concentration ozone is generated. In particular, the apparatus has a structure in which supplied ozonized gas is adsorbed efficiently, whereby high-concentration ozonized gas is generated continuously and taken out. Herein, the high-concentration ozonized gas refers to ozonized gas having a concentration higher than the ozone concentration of supplied ozonized gas.

Embodiment 1

Figure 1:
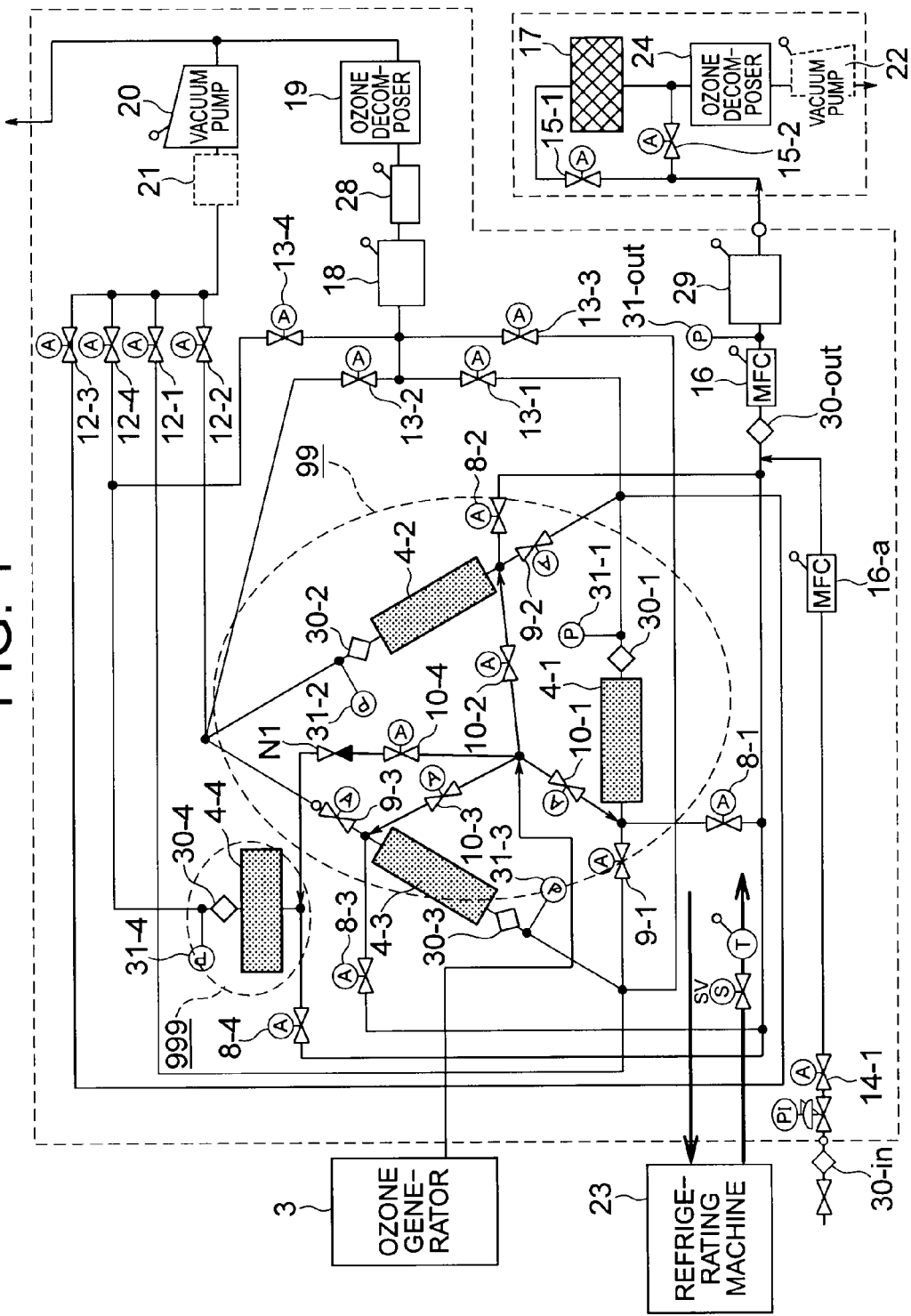
[FIG. 1] A schematic piping diagram illustrating a configuration of an apparatus for producing high-concentration ozone gas according to Embodiment 1 of the present invention.
Figure 2:
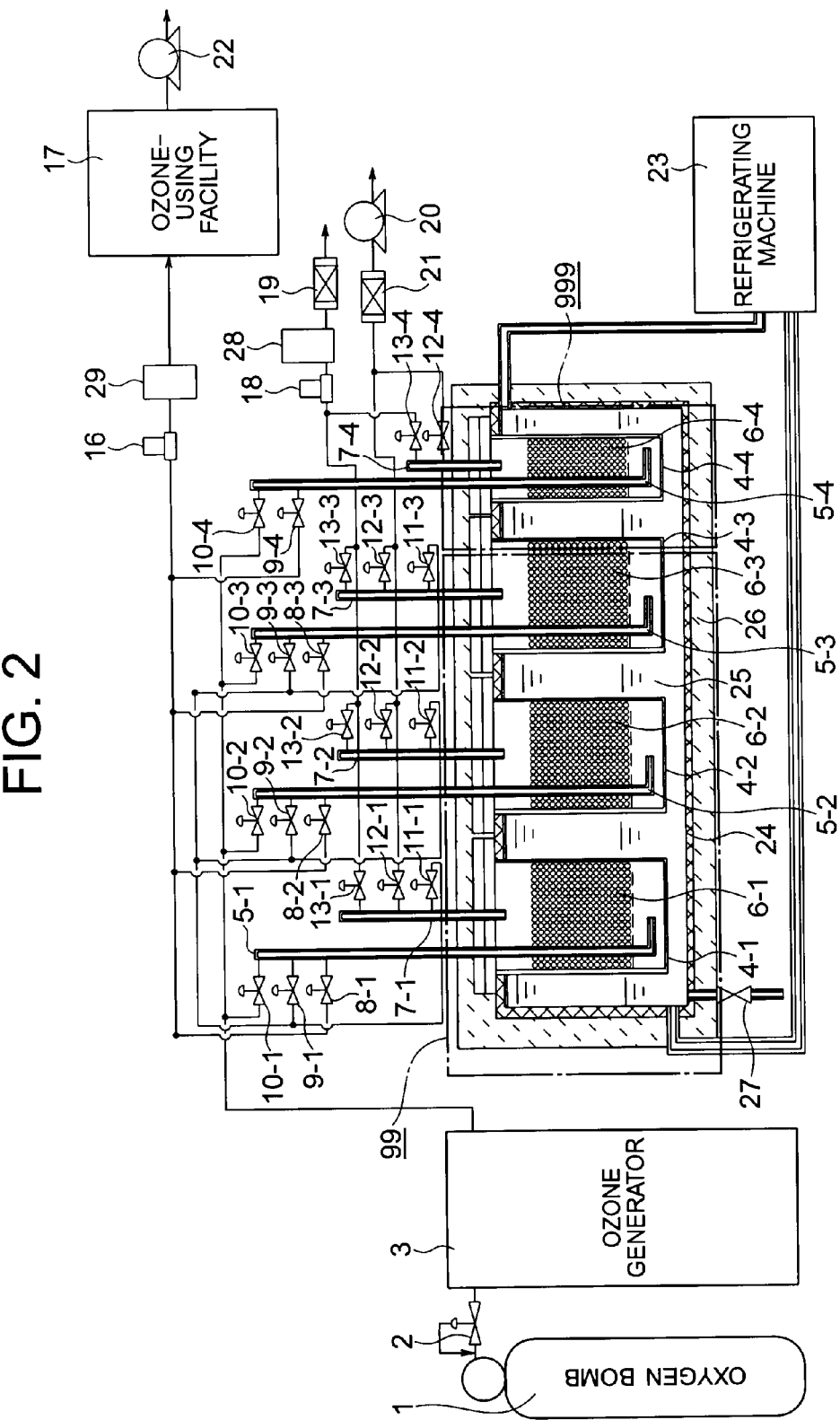
[FIG. 2] A structural view illustrating a configuration of the apparatus for producing high-concentration ozone gas according to Embodiment 1 of the present invention.
Figure 3:
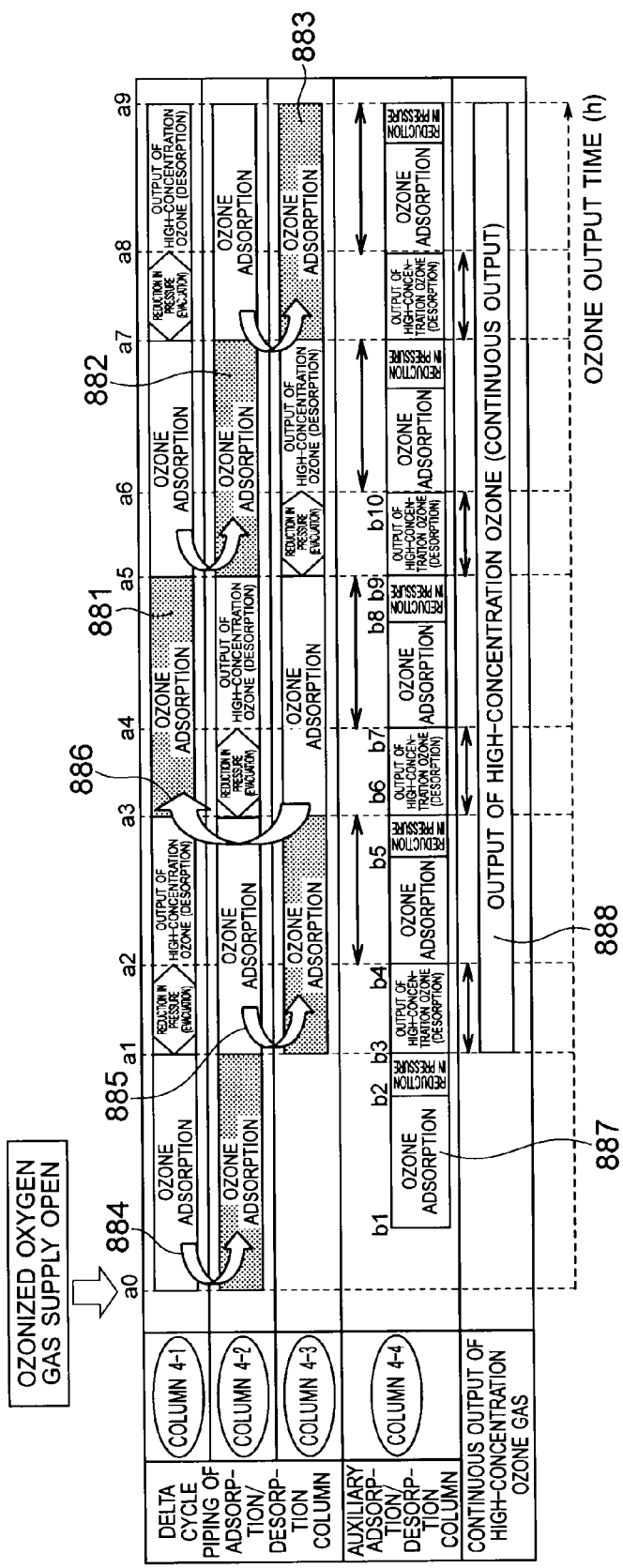
[FIG. 3] A control step chart diagram illustrating an adsorption step, a pressure reduction step, and an adsorption (output)) step in each column in Embodiment 1 of the present invention.

FIG. 1 is a schematic piping diagram illustrating a configuration of an apparatus for producing high-concentration ozone gas (or an ozone concentrator) according to Embodiment 1 of the present invention. Further, FIG. 2 illustrates an apparatus for producing high-concentration ozone gas in which the schematic piping diagram (FIG. 1) of the present invention is realized. Further, FIG. 3 is a control step chart diagram illustrating an adsorption step, an evacuation step (pressure reduction step), and a desorption step (output step) in each column in Embodiment 1 of the present invention.

In FIG. 1, reference numerals 4-1, 4-2, and 4-3 denote three adsorption/desorption columns, and supply tubes and output tubes of ozonized gas of those three adsorption/desorption columns 4 are delta-connected in a cyclic manner respectively via gas filters 30-1, 30-2, and 30-3 and open/close valves (pneumatic valves) 9-2, 9-3, and 9-1 to form an adsorption/desorption column group (hereinafter, referred to as a main adsorption/desorption column group) 99.

Further, reference numeral 4-4 denotes an auxiliary adsorption/desorption column that is connected through piping to the main adsorption/desorption group 99 in parallel and assists the output of ozonized gas in the main adsorption/desorption column group 99.

Reference numeral 3 denotes an ozone gas generator (or ozone generator) that supplies ozone of a concentration of 300 g/Nm3 to the apparatus for producing high-concentration ozone gas of the present invention. As the ozone gas generator 3, particularly, an apparatus capable of supplying nitrogen-less ozone containing no nitrogen and nitrogen oxide is adopted. The ozone gas generator 3 supplies ozone of a concentration of 300 g/Nm3 to the adsorption/desorption columns 4-1, 4-2, 4-3, and 4-4 respectively via open/close valves (pneumatic valves) 10-1, 10-2, 10-3, and 10-4.

Each ozonized gas outlet of the adsorption/desorption columns 4-1, 4-2, 4-3, and 4-4 is connected to two systems: a discharge gas system that discharges discharge gas (gas rich in oxygen) adsorbed in the adsorption/desorption columns 4 and a pressure-reducing discharge system that reduces the pressure of ozone adsorbed in the adsorption/desorption columns 4 to increase the concentration of ozone.

In the discharge gas system, the discharge gas is discharged to the atmosphere after remaining ozone is replaced by oxygen gas via the open/close valves (pneumatic valves) 13-1, 13-2, 13-3, and 13-4 of the respective columns and via a pressure controller (automatic pressure regulator, APC) 18 for controlling an adsorption pressure and a discharge ozone concentration meter 28 through an ozone decomposer 19. The discharge to the atmosphere can be switched for each column.

Herein, although the discharge ozone concentration meter 28 is provided, it may not be provided.

In the reducing-pressure discharge system, the remaining ozone is replaced by oxygen gas and the adsorption/desorption columns 4 can be reduced in pressure by a vacuum pump 20 via the open/close valves (pneumatic valves) 12-1, 12-2, 12-3, and 12-4 of the respective columns through the ozone decomposer 21.

Each ozonized gas inlet of the adsorption/desorption columns 4-1, 4-2, 4-3, and 4-4 is connected not only to an ozonized gas supply system from the ozone gas generator 3 but also to an ozonized gas output system that adsorbs ozone capable of outputting high-concentration ozonized gas adsorbed in the adsorption/desorption columns 4.

The ozonized gas output system is configured so as to output ozonized gas to outside via the open/close valves (pneumatic valves) 8-1, 8-2, 8-3, and 8-4 of the respective columns and via a gas filter 30-out, a gas flow meter (MFC) 16, and a high-concentration ozone detector 29. Further, the ozonized gas output system has a piping configuration capable of diluting oxygen gas via an open/close valve (pneumatic valve) 14-1 and a gas flow meter (MFC) 16-a from an outside bomb, and can control the flow rate of gas and the concentration of ozone of high-concentration ozone to be output arbitrarily.

Reference numeral 17 denotes an ozone reaction device, 24 denotes an ozone decomposer, 22 denotes a vacuum pump, and 15-1 and 15-2 denote open/close valves (pneumatic valves), and those components are system examples of a user using ozonized gas.

Further, reference numeral 23 denotes a refrigerating machine, which supplies a refrigerant 26 at −60° C. from the refrigerating machine 23 to the outside of a body of each adsorption/desorption column 4, thereby cooling an ozone adsorbent packed in each adsorption/desorption column 4 indirectly.

In the above, the main adsorption/desorption column group 99 is delta-connected in a cyclic manner. However, the same effects are obtained by a serial cycle arrangement even in the case of at least four adsorption/desorption columns. Herein, the serial cycle refers to the configuration in which at least three adsorption/desorption columns are communicated (connected) serially, and the communicated adsorption/desorption columns form an annular shape. At a time of ozone adsorption, at least two adjacent adsorption/desorption columns are connected to allow ozone gas to flow continuously. FIG. 1A illustrates a flow of ozone gas at a time of adsorption in the case of three columns of the main adsorption/desorption column group 99 in FIG. 1, and the filter 30 and the pressure gauge 31 are not shown. As illustrated in FIG. 1A(a), the ozone generated by the ozone generator 3 is subjected to flow adsorption through the open/close valve 10-1, the adsorption/desorption column 4-1, the open/close valve 9-2, the adsorption/desorption column 4-2, and the open/close valve 13-2. In this case, the adsorption/desorption columns 4-1 and 4-2 are communicated to each other. As illustrated in FIG. 1A(b), after the adsorption/desorption column 4-1 is subjected to adsorption breakthrough, the ozone gas flows through the ozone generator 3, the open/close valve 10-2, the adsorption/desorption column 4-2, the open/close valve 9-3, the adsorption/desorption column 4-3, and the open/close valve 13-3, and the adsorption/desorption columns 4-2 and 4-3 are communicated to each other. Further, as illustrated in FIG. 1A(c), after the adsorption/desorption column 4-2 is subjected to adsorption breakthrough, the adsorption/desorption columns 4-3 and 4-1 are communicated to each other, and, as illustrated in FIG. 1A(d), after the adsorption/desorption column 4-3 is subjected to adsorption breakthrough, the adsorption/desorption columns 4-1 and 4-2 are communicated again.

Figure 1B:
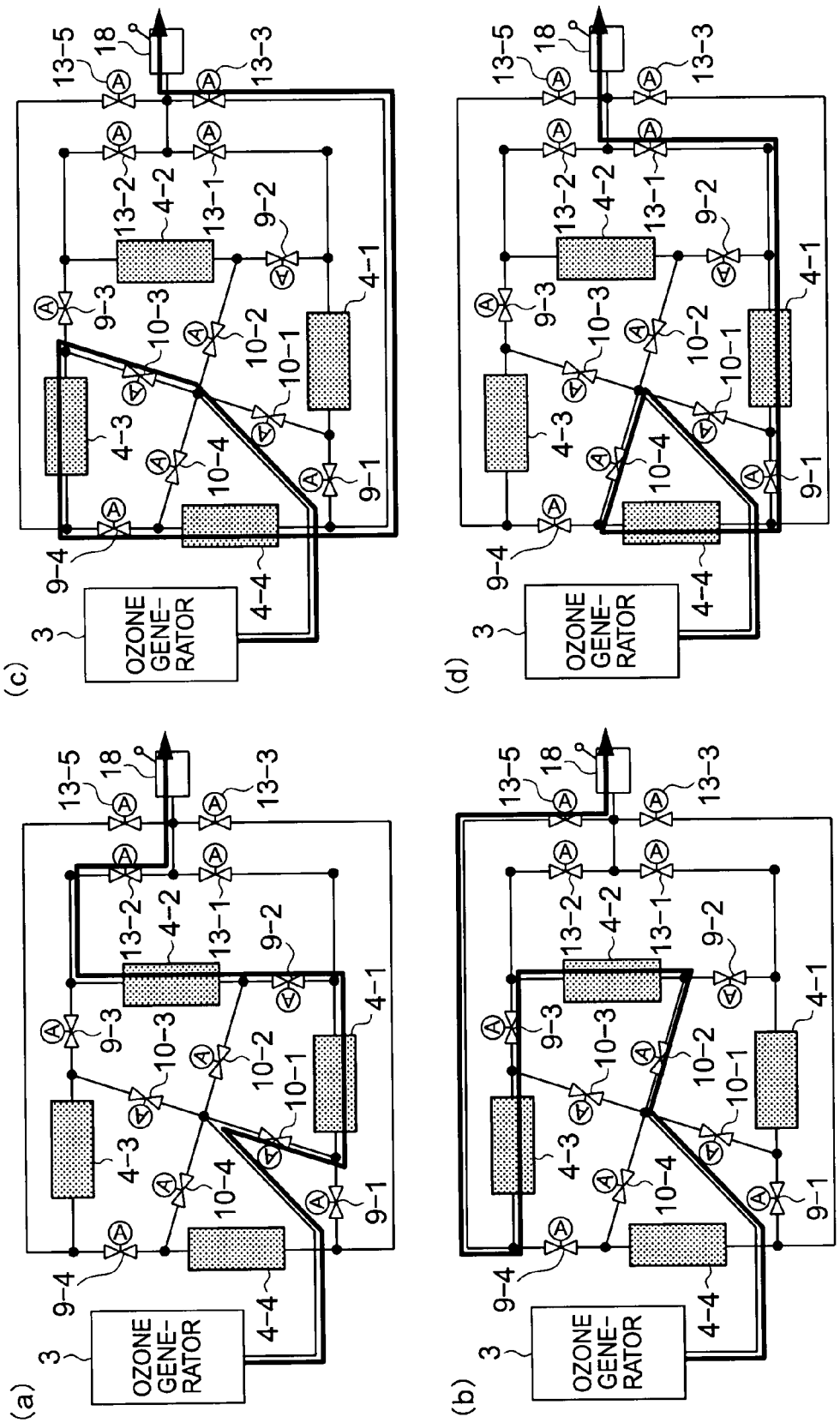
[FIG. 1B] An explanatory view illustrating portions of the main adsorption/desorption column group and an auxiliary adsorption/desorption column in FIG. 1, which illustrates a flow of ozone gas at a time of adsorption in a serial cycle arrangement in the case of four columns.

Next, FIG. 1B illustrates a serial cycle arrangement in the case of four columns. Herein, because four columns are used, an adsorption/desorption column 4-4 and open/close valves 9-4, 10-4, and 13-5 are newly added. Further, even herein, the filter 30 and the pressure gauge 31 are not shown. As illustrated in FIG. 1B(a), the ozone generated by the ozone generator 3 is subjected to flow adsorption through the open/close valve 10-1, the adsorption/desorption column 4-1, the open/close valve 9-2, the adsorption/desorption column 4-2, and the open/close valve 13-2. In this case, the adsorption/desorption columns 4-1 and 4-2 are communicated to each other. After the adsorption/desorption column 4-1 is subjected to adsorption breakthrough, as illustrated in FIG. 1B(b), the ozone gas flows through the ozone generator 3, the open/close valve 10-2, the adsorption/desorption column 4-2, the open/close valve 9-3, the adsorption/desorption column 4-3, and the open/close valve 13-5, and the adsorption/desorption columns 4-2 and 4-3 are communicated to each other. Further, as illustrated in FIG. 1B(c), after the adsorption/desorption column 4-2 is subjected to adsorption breakthrough, the adsorption/desorption columns 4-3 and 4-4 are communicated to each other, and, as illustrated in FIG. 1B(d), after the adsorption/desorption column 4-3 is subjected to adsorption breakthrough, the adsorption/desorption columns 4-4 and 4-1 are communicated to each other.

Figure 1C:
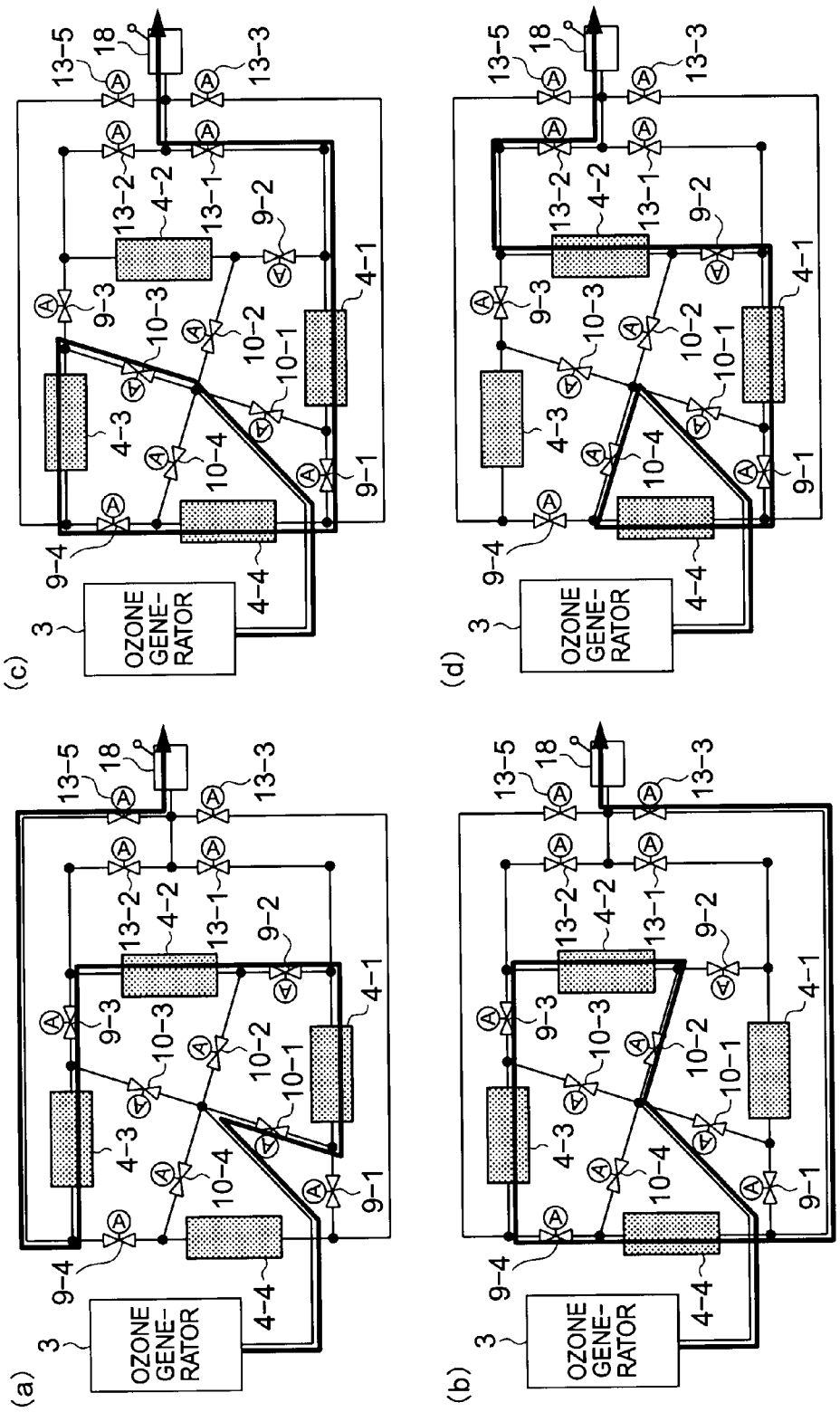
[FIG. 1C] An explanatory view illustrating portions of the main adsorption/desorption column group and the auxiliary adsorption/desorption column in FIG. 1, which illustrates a flow of ozone gas at a time of adsorption in another example of the serial cycle arrangement in the case of four columns.

Further, in the case where four columns are placed in a serial cycle arrangement, as illustrated in FIG. 1C, the three adjacent columns may be communicated to each other. In this case, as illustrated in FIG. 1C(a), the ozone generated by the ozone generator 3 is subjected to flow adsorption through the open/close valve 10-1, the adsorption/desorption column 4-1, the open/close valve 9-2, the adsorption/desorption column 4-2, the open/close valve 9-3, the adsorption/desorption column 4-3, and the open/close valve 13-5. In this case, the adsorption/desorption columns 4-1, 4-2, and 4-3 are communicated to each other. After the adsorption/desorption column 4-1 is subjected to adsorption breakthrough, as illustrated in FIG. 1C(b), the ozone gas flows through the ozone generator 3, the open/close valve 10-2, the adsorption/desorption column 4-2, the open/close valve 9-3, the adsorption/desorption column 4-3, the open/close valve 9-4, the adsorption/desorption column 4-4, and the open/close valve 13-3, and the adsorption/desorption columns 4-2, 4-3, and 4-4 are communicated to each other. Further, after the adsorption/desorption column 4-2 is subjected to adsorption breakthrough, as illustrated in FIG. 1C(c), the adsorption/desorption columns 4-3, 4-4, and 4-1 are communicated to each other, and after the adsorption/desorption column 4-3 is subjected to adsorption breakthrough, as illustrated in FIG. 1C(d), the adsorption/desorption columns 4-4, 4-1, and 4-2 are communicated to each other.

FIG. 2 illustrates an integrated configuration of the apparatus configuration in FIG. 1, in which a piping layout is illustrated as a configuration of a real apparatus. As illustrated in FIG. 2, in the apparatus for producing high-concentration ozone gas of the present invention, a main adsorption/desorption column group 99 composed of three adsorption/desorption columns and an auxiliary adsorption/desorption column 999 are integrated in a refrigerating tank (hereinafter, referred to as cooling tank) 24 for keeping a low temperature of −60° C. Further, as illustrated in FIG. 2, the adsorption/desorption columns 4 are designed so that all the inlet/outlet pipes for gas are placed in an upper part to enable an integrated piping of a plurality of open/close valves (pneumatic valves, open/close valves). In FIGS. 1 and 2, although the adsorption/desorption columns are denoted with reference numerals 4-1, 4-2, 4-3, and 4-4, respectively, they are described collectively as reference numeral 4 in the following description. In the same way as in the other configurations, X-1 denotes a member provided so as to correspond to the adsorption/desorption column 4-1, X-2 denotes a member provided so as to correspond to the adsorption/desorption column 4-2, and X-3 denotes a member provided so as to correspond to the adsorption/desorption column 4-3, and they are collectively denoted simply as X (herein, X indicates numbers of 5 to 13).

The four adsorption/desorption columns 4 are contained in a cooling tank 24, the outside of which is covered with a heating-insulating material. In each adsorption/desorption column 4, a silica gel 6 of high purity higher than a predetermined purity is placed as an ozone adsorbent. As illustrated in FIG. 1, the silica gel 6 is placed only in a center portion in a height direction so that spaces are formed in upper and lower portions of the adsorption/desorption column 4. The silica gel 6 has a spherical shape with a diameter of 1 to 5 mm, and fills the adsorption/desorption column 4 so as to form a complementary shape with respect to an inner wall of the adsorption/desorption column 4 (if the inner wall has a cylindrical shape, the silica gel 6 has a columnar shape) and to come into close contact with the inner wall of the adsorption/desorption column 4. A refrigerating machine 23 is connected to the cooling tank 24, and a refrigerant 25 cooled to a predetermined temperature by the refrigerating machine 23 circulates in the cooling tank 24. The silica gel 6 is always cooled with the refrigerant 25. Further, a drain open/close valve 27 is provided at a bottom portion of the cooling tank 24 so as to penetrate the heat-insulating material 26, and if required (for example, for maintenance), the drain open/close valve 27 is opened to discharge the refrigerant 25 in the cooling tank 24 outside therefrom. Further, a substantially L-shaped inlet gas communication tube 5 and a substantially I-shaped outlet gas communication tube 7 are inserted in each adsorption/desorption column 4 in a vertical direction from above. The inlet gas communication tube 5 penetrates the silica gel 6 to the lower portion, and the outlet gas communication tube 7 penetrates up to the portion above the silica gel 6, not reaching the silica gel 6. Thus, an L-shaped gas introduction port at a lower end of the inlet gas communication tube 5 and a discharge port at a lower end of the outlet gas communication tube 7 are placed with the silica gel 6 interposed therebetween. Further, each inlet gas communication tube 5 is provided with three inlet open/close valves 8, 9, and 10. Further, each outlet gas communication tube 7 is provided with three outlet open/close valves 11, 12, and 13.

An ozone generator 3 and an oxygen bomb 1 are provided outside the cooling tank 24, and the oxygen bomb 1 is connected to the ozone generator 3 via a pressure-reducing valve 2. Ozone of a predetermined concentration is generated by feeding oxygen from the oxygen bomb 1 to the ozone generator 3 and supplied to the adsorption/desorption column 4. The ozone generator 3 may be the one that is currently used generally as an ozone generating device. Further, an ozone-using facility 17 is provided outside the cooling tank 24 and supplied with ozone of high concentration generated by the adsorption/desorption column 4. The ozone-using facility 17 is provided with a vacuum pump 22 for reducing the pressure of the ozone-using facility 17.

As described above, the apparatus for producing high concentration of ozone gas according to Embodiment 1 of the present invention includes an ozone generator 3 that generates ozone from oxygen, a plurality of adsorption/desorption columns 4 in which the silica gel 6 that is an ozone adsorbent cooled with the certain-temperature refrigerant 25 is packed so as to concentrate ozone generated by the ozone generator 3, a refrigerating machine 23 that is cooling means for cooling the refrigerant 25, the vacuum pump 20 connected to the adsorption/desorption columns 4 for discharging mainly oxygen from the silica gel 6 adsorbing the ozone, thereby concentrating the ozone in the adsorption/desorption columns 4, a plurality of open/close valves 8 to 13 for air pressure operations, connected to the adsorption/desorption columns 4, for switching passages of gas that is to flow in or flow out with respect to the adsorption/desorption columns 4, and ozone concentration meters 28, 29 for measuring the concentration of the ozone concentrated by the vacuum pump 20, in which a discharge line of the vacuum pump 20 that concentrates the ozone in one of the adsorption/desorption columns 4 in which the silica gel 6 is packed is allowed to pass through another one of the adsorption/desorption columns 4 again. In this configuration, the three adsorption/desorption columns 4 repeatedly perform the adsorption step of adsorbing ozone, the vacuum discharging step (evacuating step or pressure-reducing step) of discharging adsorbed ozone in vacuum to enhance the concentration of ozone gas, and desorption step (output step) of sending out the concentrated ozone, thereby adsorbing ozone again, the concentration of which does not reach a predetermined concentration and which used to be discarded conventionally. Thus, ozone is concentrated to a predetermined ozone concentration in a range of 30 to 100 vol %, required by an ozone-using facility, and can be used.

FIG. 3 is a chart diagram illustrating a switching timing of an adsorption step, a pressure-reducing step, and a high-concentration ozone output step (desorption step) of each column of the main adsorption/desorption column group 99 having three adsorption/desorption columns and the auxiliary adsorption/desorption column 999. In the main adsorption/desorption column group 99, the adsorption step is repeated every two columns of three columns, the pressure-reducing step and the desorption step are repeated every one column, and three columns of the main adsorption/desorption column group 99 are subjected to cascade arrangement piping so as to output high-concentration ozonized gas. The auxiliary adsorption/desorption column 999 is connected to the main adsorption/desorption column group 99 in parallel so that the desorption step can be performed during a period in which the main adsorption/desorption column group 99 cannot output (period in which the desorption step is not performed in any of the adsorption/desorption columns of the main adsorption/desorption column group 99), and the adsorption step and the pressure-reducing step are repeated in the other periods. Although the auxiliary adsorption/desorption column 999 of the present invention is composed of only one column, a method of setting one timing for interpolation of the period in which the main adsorption/desorption column group 99 cannot output by placing a plurality of auxiliary adsorption/desorption columns and increasing the volume of the columns as another embodiment is also included in the present invention.

Next, the operation of the apparatus for producing high-concentration ozone gas according to Embodiment 1 is described with reference to the schematic diagram of FIG. 1 and the chart diagram of FIG. 3. Oxygen is placed in the ozone generator 3 from the oxygen bomb 1 to generate ozone. First, at a time a0, the ozone is placed in the adsorption/desorption column 4-1 by opening the inlet open/close valve 10-1, and the silica gel 6-1 in the adsorption/desorption column 4-1 cooled via the refrigerant 25 cooled by the refrigerating machine 23 is allowed to adsorb the ozone almost to a saturation adsorption state (time a1). The discharged ozonized oxygen gas, that cannot be adsorbed in the adsorption/desorption column 4-1, is placed in the subsequent adsorption/desorption column 4-2 via the gas filter 30-1 by opening the open/close valve 9-2. Thin ozonized oxygen gas, that cannot be adsorbed in the adsorption/desorption column 4-1, is preliminarily adsorbed in the adsorption/desorption column 4-2, and released, by opening the outlet open/close valve 13-2, to the atmosphere from the adsorption/desorption column 4-2 through the pressure controller (APC) 18, the ozone concentration meter 28, and the ozone decomposer 19 having an ozone decomposing catalyst. Therefore, the gas discharged from the adsorption/desorption column 4-2 is almost only oxygen gas.

Next, in a period a1-a2, the open/close valve 12-1 is opened, and the adsorption/desorption column 4-1 adsorbed to a saturation adsorption state is reduced in pressure (evacuated) with the vacuum pump 20 through the ozone decomposer 21 to take out the gas (mainly, oxygen gas) remaining in the column, whereby the concentration of ozone in the column is increased to obtain only the ozone-adsorbed state.

After that, in a period a2-a3, the open/close valve 8-1 is opened to output the ozone adsorbed in the adsorption/desorption column 4-1 in a predetermined flow rate through the gas filter 30-out, the gas flow meter (MFC) 16, and the ozone concentration meter 29 as high-concentration ozonized gas of a predetermined concentration or more to the outside. The ozone can be output by being controlled to a predetermined ozone flow rate by the MFC 16. Further, the concentration of the high-concentration ozonized gas is controlled so as to be a predetermined ozonized gas concentration by mixing and diluting the ozonized gas of about 2035 g/Nm3 (95 vol %) output from the adsorption/desorption column 4-1 and the oxygen gas output from the oxygen supply port 30-in through the pressure-reducing valve, the open/close valve 14-1, and the MFC 16-a. That is, the flow rate of oxygen to be mixed and diluted is controlled by the MFC 16-a in accordance with the ozone concentration instruction output from the outside.

The adsorption/desorption column 4-2 opens, at the time a1, the inlet open/close valve 10-2 so that the silica gel 6-2 in the adsorption/desorption column 4-2 is allowed to adsorb the ozone almost to a saturation adsorption state (time a3). The discharged ozonized oxygen gas, that cannot be adsorbed in the adsorption/desorption column 4-2, is placed in the subsequent adsorption/desorption column 4-3 via the gas filter 30-2 by opening the open/close valve 9-3. Thin ozonized oxygen gas, that cannot be adsorbed in the adsorption/desorption column 4-2, is preliminarily adsorbed in the adsorption/desorption column 4-3, and released to the atmosphere from the adsorption/desorption column 4-3 through the pressure controller (APC) 18, the ozone concentration meter 28, and the ozone decomposer 19 by opening the outlet open/close valve 13-3. Therefore, the gas discharged from the adsorption/desorption column 4-3 is almost only oxygen gas.

Next, in a period a3-a4, the open/close valve 12-2 is opened, and the adsorption/desorption column 4-2 in which the gas is adsorbed to a saturation adsorption state is reduced in pressure (evacuated) with the vacuum pump 20 through the ozone decomposer 21 to take out the remaining gas in the column, whereby only the ozone-adsorbed state is obtained.

After that, in a period a4-a5, the open/close valve 8-2 is opened to output the ozone adsorbed in the adsorption/desorption column 4-2 in a predetermined flow rate through the gas filter 30-out, the gas flow meter (MFC) 16, and the ozone concentration meter 29 as high-concentration ozonized gas of a predetermined concentration or more to the outside.

In the same way, the adsorption/desorption column 4-3, at a time a3, opens the inlet open/close valve 10-3, so that the silica gel 6-3 in the adsorption/desorption column 4-3 is allowed to adsorb the ozone almost to a saturation adsorption state (time a5). The discharged ozonized oxygen gas, that cannot be adsorbed in the adsorption/desorption column 4-3, is placed in the subsequent adsorption/desorption column 4-1 via the gas filter 30-3 by opening the open/close valve 9-1. Thin ozonized oxygen gas, that cannot be adsorbed in the adsorption/desorption column 4-3, is preliminarily adsorbed in the adsorption/desorption column 4-1, and released to the atmosphere from the adsorption/desorption column 4-3 through the pressure controller (APC) 18, the ozone concentration meter 28, and the ozone decomposer 19 by opening the outlet open/close valve 13-1.

Next, in a period a5-a6, the open/close valve 12-3 is opened, and the adsorption/desorption column 4-3 in which the gas is adsorbed to a saturation adsorption state is reduced in pressure (evacuated) with the vacuum pump through the ozone decomposer 21.

In a period a6-a7, the open/close valve 8-3 is opened to output the ozone adsorbed in the adsorption/desorption column 4-3 through the gas filter 30-out, the gas flow meter (MFC) 16, and the ozone concentration meter 29 as high-concentration ozonized gas of a predetermined concentration or more to the outside.

As described above, as illustrated in the chart diagram of FIG. 3, in the three adsorption/desorption columns 4-1, 4-2, and 4-3 of the main adsorption/desorption column group 99, high-concentration ozonized gas can be output to the outside in the periods a2-a3, a4-a5, and a6-a7, whereas high-concentration ozonized gas cannot be output in the periods a1-a2, a3-a4, and a5-a6 that are pressure-reducing step periods in each column. In order to compensate for the periods in which ozonized gas cannot be output, another auxiliary adsorption/desorption column 999 is provided in addition to the main adsorption/desorption column group 99, and high-concentration ozonized gas of a predetermined concentration or more is output to the outside from the auxiliary adsorption/desorption column 999 in the periods a1-a2, a3-a4, and a5-a6, whereby high-concentration ozonized gas can be output continuously.

That is, as the operation of the auxiliary adsorption/desorption column 999, a part of ozonized oxygen generated from the ozone gas generator 3 is adsorbed by the silica gel 6-4 in the adsorption/desorption column 4-4 by opening the inlet open/close valve 10-4 at a time b1 with a needle valve N1 up to the time b2 while adjusting the flow rate of ozonized oxygen gas. In a period b1-b2, the outlet open/close valve 13-4 is opened, and the ozonized gas is released to the atmosphere through the pressure controller (APC) 18, the ozone concentration meter 28, and the ozone decomposing catalyst 19.

Next, in a period b2-b3, the open/close valve 12-4 is opened, and the gas remaining in the column is taken out by reducing the pressure of (evacuating) the adsorption/desorption column 4-4 adsorbing the gas with the vacuum pump 20 through the ozone decomposer 21, whereby only an ozone-adsorbed state is obtained.

After that, in a period b3-b4 that is the same time band as that of the period a1-a2, the open/close valve 8-4 is opened, whereby the ozone adsorbed in the adsorption/desorption column 4-4 is output to the outside in a predetermined flow rate as high-concentration ozonized gas of a predetermined concentration or more through the gas filter 30-out, the gas flow meter (MFC) 16, and the ozone concentration meter 29.

In the same way as in the above-mentioned operation, the adsorption/desorption column 4-4 allows ozonized gas to be adsorbed in periods b4-b5 and b7-b8 (adsorption step), the pressure-reducing step is performed in periods b5-b6 and b8-b9, and high-concentration ozonized gas is output to the outside from the adsorption/desorption column 4-4 that is the auxiliary adsorption/desorption column 999 in a period b6-b7 that is the same time band as that of the period a3-a4 and a period b9-b10 that is the same time band as that of the period a5-a6.

Thus, by providing another auxiliary adsorption/desorption column 999 in addition to the main adsorption/desorption column group 99, high-concentration ozonized gas can be output continuously during the period a1-a9.

The open/close states of the respective open/close valves 9, 10, 11, 12, and 13 have been described only regarding the open/close time. However, the respective open/close valves 9, 10, 11, 12, and 13 are opened/closed in a time series in accordance with the chart diagram of FIG. 3 (herein, the description of the open/close operation of each open/close value is omitted for simplicity).

Further, in the apparatus of the present application, ozone is adsorbed more as an ozone partial pressure is higher. Therefore, during ozone adsorption, ozone is adsorbed while the pressure is adjusted to a gauge pressure of 0.1 MPa or more exceeding the atmospheric pressure by the pressure controller (APC) 18.

As described above, in the apparatus for producing high-concentration ozone gas of the present invention, ozone gas can be adsorbed efficiently by forming the adsorption/desorption columns 4-1, 4-2, and 4-3 of the main adsorption/desorption column group 99 in a delta-connected piping configuration as illustrated in FIG. 1. Therefore, the amount of ozone supplied from the ozone gas generator that supplies can be saved, and the ozone treatment apparatus 19 can be reduced in size. In addition, the apparatus in a compact size is capable of outputting high-concentration ozone in a large volume can be provided at a low cost.

Further, in the present invention, ozonized gas of a predetermined concentration C exceeding the atmospheric pressure is supplied to an adsorption/desorption column packed with an ozone adsorbent adsorbing ozone, which is set at a low temperature state of 0° C. or less and a high atmospheric pressure, and a main adsorption/desorption column group in which three adsorption/desorption columns packed with an ozone adsorbent are placed in a serial cycle arrangement and an auxiliary adsorption/desorption column formed of one adsorption/desorption column placed in parallel with the main adsorption/desorption column group are provided, whereby ozone adsorbed in the auxiliary adsorption/desorption column is desorbed during a period in which the desorption step is not performed by any of the three columns of the main adsorption/desorption column group. Thus, high-concentration ozone can be output in a large flow rate continuously. In the above-mentioned description, an example in which the main adsorption/desorption column group is formed of three adsorption/desorption columns has been described. However, the present invention is also not limited to this case, and the main adsorption/desorption column group may be formed of at least three columns. Further, an example in which the auxiliary adsorption/desorption column is formed of one adsorption/desorption column has been described. However, the present invention is also not limited to this case, and at least one column may be provided.

Further, in the present invention, an apparatus for producing high-concentration gas is configured as follows. Ozonized gas of a predetermined concentration C is supplied to the adsorption/desorption column 4 packed with an ozone adsorbent formed of the high-purity silica gel 6 that adsorbs ozone gas, which is set at a low temperature state of 0° C. or less and a high atmospheric pressure, whereby the ability of the ozone adsorbent for adsorbing ozone is enhanced, and a main adsorption/desorption column group in which three adsorption/desorption columns 4 packed with an ozone adsorbent are placed and an auxiliary adsorption/desorption column formed of one column are provided, whereby ozone adsorbed in the auxiliary adsorption/desorption column is desorbed during a period in which the desorption step is not performed by any of the three columns of the main adsorption/desorption column group, and high-concentration ozone can be output continuously. Each adsorption/desorption column 4 of the main adsorption/desorption column group is formed in a delta piping configuration via the open/close valves A (9-1, 9-2, 9-3). As a piping system supplying ozonized gas from the ozone gas generator 3 to the ozone supply ports of the three respective adsorption/desorption columns 4, a parallel piping configuration is provided at each adsorption/desorption column 4 via the open/close valves B (10-1, 10-2, 10-3). As a piping system that discharges discharge gas (oxygen gas) after the ozonized gas is adsorbed during the adsorption step period to the ozone output ports of the three respective adsorption/desorption columns 4, a parallel piping configuration is provided at the ozone decomposer 19 via the open/close valves (13-1, 13-2, 13-3) and the pressure controller (APC) 28 that adjusts the pressure in the adsorption/desorption columns. As a piping system for roughly evacuating the adsorption/desorption column 4 during the rough evacuation step, a parallel piping configuration is provided at the vacuum pump 20 via the open/close valves D (12-1, 12-2, 12-3). Further, as a piping system for taking out high-concentration ozone during the desorption step, a parallel piping configuration for outputting concentrated ozonized gas is provided via the open/close valves E (8-1, 8-2, 8-3). The open/close valves A, B, C, and D are opened/closed for each adsorption/desorption column 4 so that the ozone adsorption step of supplying ozonized gas and discharging the adsorbed ozonized gas every two columns of the three columns that are delta-connected, the ozonized-gas rough-evacuation step of roughly evacuating only the adsorption/desorption column in the front stage that adsorbs ozonized gas in the ozone adsorption step, and the desorption step of taking out high-concentration ozone from the roughly evacuated adsorption/desorption column are repeated in a time series. Therefore, ozone can be adsorbed or desorbed efficiently, and the amount of ozone to be discharged from the adsorption/desorption column during the adsorption step can be reduced, and the concentration of ozone to be discharged can be reduced. Thus, the apparatus in a compact size can be realized at a low cost.

Further, the present invention has a configuration in which a discharge line of the vacuum pump 20 that concentrates ozone in the adsorption/desorption column 4 packed with the silica gel 6 is allowed to pass through another adsorption/desorption column 4 again. Due to this configuration, ozone that has not reached a predetermined concentration and used to be discarded is conventionally adsorbed again, whereby the ozone can be used by being concentrated to a predetermined ozone concentration required by an ozone-using facility in a range of 30 to 100 vol %, which is economical.

Further, in the present invention, the concentration of ozone of ozonized gas of a predetermined concentration to be supplied to the adsorption/desorption columns 4 is set to be 300 g/Nm3 or more, and the adsorption pressure in the adsorption/desorption column is set in a range of 0.15 MPa (G) to 0.5 MPa(G), whereby the ability of the ozone adsorbent in each adsorption/desorption column 4 to adsorb ozone is enhanced further, and an apparatus in a further compact size can be provided at a lower cost, when the adsorption temperature in the adsorption/desorption columns 4 is set to be −70° C. or more.

Further, in the apparatus for producing high-concentration ozone gas of the present invention, the amount of ozonized gas or oxygen gas obtained in the ozone generator 3 is controlled by dilution or addition with respect to concentrated gas of high-concentration ozone to be taken out, whereby the concentration of high-concentration ozonized gas to be taken out can be controlled in a wide range.

Further, in the apparatus for producing high-concentration ozone of the present invention, if ozonized gas which is substantially free of nitrogen-based gas added thereto, in which the added amount of nitrogen or nitrogen oxide gas is 0.01% or less, is concentrated, high-concentration ozonized gas to be taken out can be provided at a low cost as ozonized gas of high quality that can be used in a chemical reaction process in the semiconductor production apparatus field.

Further, if nitrogen-based gas is also adsorbed in addition to adsorbed ozone, the vapor pressure characteristics of the ozone are different from those of the nitrogen-based gas, and hence the nitrogen-based gas adsorbed during the desorption of the ozone gas is evaporated rapidly, which may cause explosion. However, an apparatus without any danger of explosion can be provided by not allowing nitrogen-based gas to be contained in gas.

Further, the present invention has a configuration in which the discharge line of the vacuum pump 20 that enhances the ozone concentration of the adsorption/desorption column 4 packed with an adsorbent is connected to another adsorption/desorption column 4 so as to pass through another adsorption/desorption column 4 again. Therefore, stabilized concentrated ozone can be generated with a good energy efficiency without any upper and lower temperature difference of the adsorption/desorption columns 4.

Further, in an apparatus for generating high-concentration ozone gas in which ozonized gas containing nitrogen gas or nitrogen oxide gas is concentrated, $NO_x$ gas is generated in the apparatus to corrode metal in the apparatus or $NO_x$ enters an adsorbent to degrade the ability to adsorb ozonized gas. Thus, the life of the apparatus may be shortened. Further, high-concentration ozonized gas to be output contains metal impurities (metal contaminants) due to the chemical reaction between the $NO_x$ gas and the metal surface in the apparatus, and consequently, the quality of film formation of the apparatus for producing a semiconductor using high-concentration ozonized gas is degraded. In order to solve these problems, in the ozone gas generator of the present invention, ozonized gas containing no nitrogen and nitrogen oxide gas is used, whereby high-concentration and high-purity ozonized gas without any impurities can be supplied in the semiconductor production field, and the present invention can contribute to the enhancement of a film-formation technology of higher quality.

Embodiment 2

Figure 4:
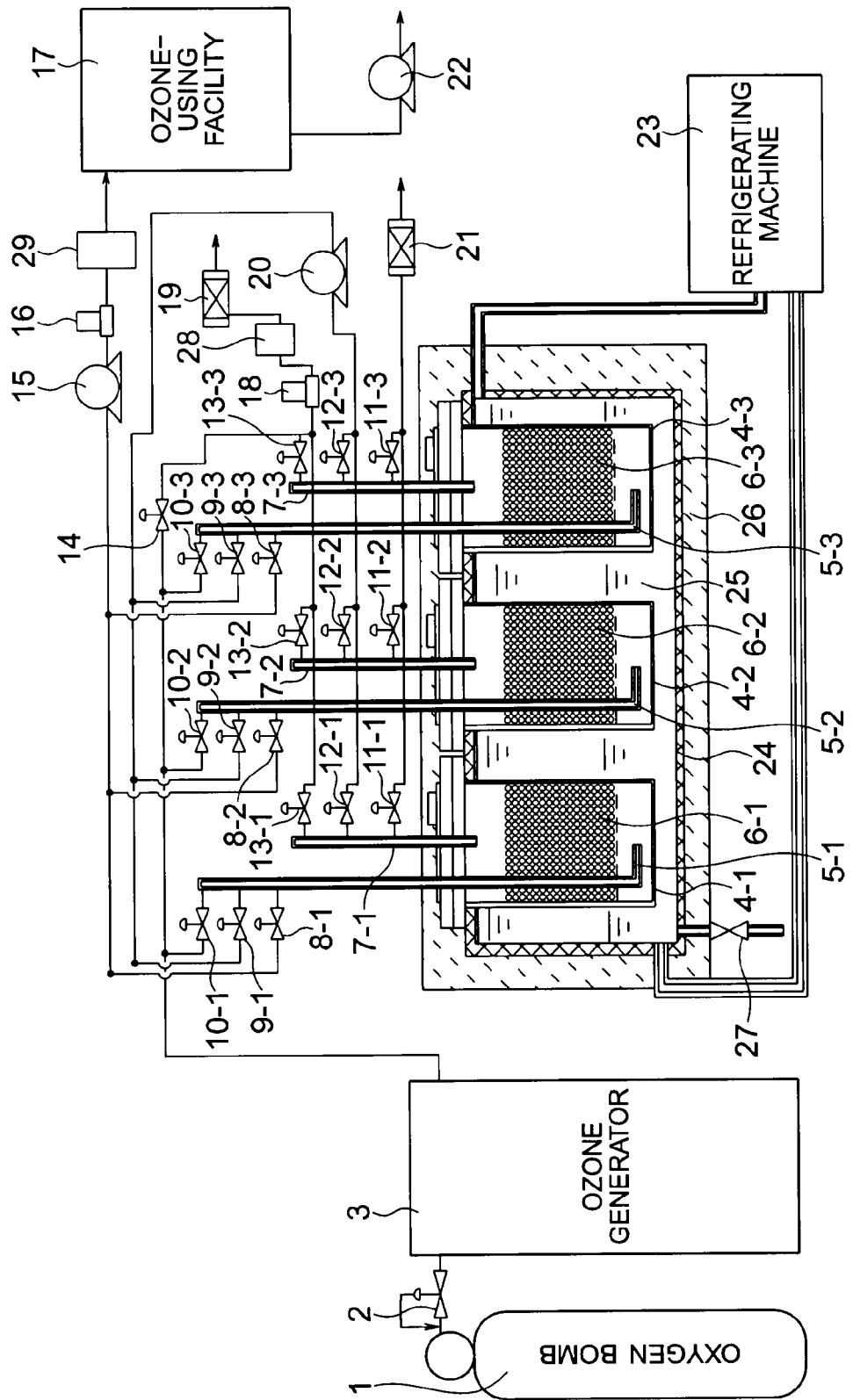
[FIG. 4] A structural view illustrating a configuration of an apparatus for producing high-concentration ozone gas according to Embodiment 2 of the present invention.

FIG. 4 is a view illustrating an apparatus for producing high-concentration ozone gas according to Embodiment 2 of the present invention. As illustrated in FIG. 4, the apparatus for producing high-concentration ozone gas according to Embodiment 2 of the present invention is provided with three adsorption/desorption columns 4. In FIG. 4, although the adsorption/desorption columns are denoted with reference numerals 4-1, 4-2, and 4-3, respectively, they are described collectively as reference numeral 4 in the following description. In the same way as in the other configurations, X-1 denotes a member provided so as to correspond to the adsorption/desorption column 4-1, X-2 denotes a member provided so as to correspond to the adsorption/desorption column 4-2, and X-3 denotes a member provided so as to correspond to the adsorption/desorption column 4-3, and they are collectively denoted simply as X (herein, X indicates numbers of 5 to 13).

Returning to FIG. 4, the three adsorption/desorption columns 4 are contained in a cooling tank 24 the outside of which is covered with a heat-insulating material 26. In each adsorption/desorption column 4, a silica gel 6 is placed as an ozone adsorbent. As illustrated in FIG. 4, the silica gel 6 is placed only in a center portion in a height direction so that spaces are formed in upper and lower portions of the adsorption/desorption column 4. The silica gel 6 has a particulate, desirably, spherical shape with a diameter of 1 to 5 mm, and fills the adsorption/desorption column 4 so as to form a complementary shape with respect to an inner wall of the adsorption/desorption column 4 (if the inner wall has a cylindrical shape, the silica gel 6 has a columnar shape) and to come into close contact with the inner wall of the adsorption/desorption column 4. A refrigerating machine 23 is connected to the cooling tank 24, and a refrigerant 25 cooled to a predetermined temperature by the refrigerating machine 23 circulates in the cooling tank 24. The silica gel 6 is always cooled with the refrigerant 25. Further, a drain open/close valve 27 is provided at a bottom portion of the cooling tank 24 so as to penetrate the heat-insulating material 26, and if required (for example, for maintenance), the drain open/close valve 27 is opened to discharge the refrigerant 25 in the cooling tank 24 outside therefrom. Further, a substantially L-shaped inlet gas communication tube 5 and a substantially I-shaped outlet gas communication tube 7 are inserted in each adsorption/desorption column 4 in a vertical direction from above. The inlet gas communication tube 5 penetrates the silica gel 6 to the lower portion, and the outlet gas communication tube 7 penetrates up to the portion above the silica gel 6, not reaching the high-purity silica gel 6. Thus, an L-shaped gas introduction port at a lower end of the inlet gas communication tube 5 and a discharge port at a lower end of the outlet gas communication tube 7 are placed with the silica gel 6 interposed therebetween. Further, each inlet gas communication tube 5 is provided with three inlet open/close valves 8, 9, and 10. Further, each outlet gas communication tube 7 is provided with three outlet open/close valves 11, 12, and 13.

An ozone generator 3 and an oxygen bomb 1 are provided outside the cooling tank 24, and the oxygen bomb 1 is connected to the ozone generator 3 via a pressure-reducing valve 2. Ozone is generated by feeding oxygen from the oxygen bomb 1 to the ozone generator 3 and supplied to the adsorption/desorption column 4. The ozone generator 3 may be the one that is currently used generally as an ozone generating device. Further, an ozone-using facility 17 is provided outside the cooling tank 24 and supplied with ozone of high concentration generated by the adsorption/desorption column 4. The ozone-using facility 17 is provided with a vacuum pump 22 for reducing the pressure of the ozone-using facility 17.

The ozone generator 3 is communicated with the high-purity silica gel 6 in the adsorption/desorption column 4 via an inlet open/close valves 10 and the inlet gas communication tube 5. Further, the high-purity silica gel 6 is communicated with an ozone-decomposing catalyst 19 via the outlet gas communication tube 7, an outlet open/close valve 13, a pressure controller (APC) 18, and an ozone concentration meter 28, all of which are connected so as to adsorb ozone.

Further, each adsorption/desorption column 4 is connected to the ozone-decomposing catalyst 21 by way of the outlet gas communication tube 7, the outlet open/close valve 12, and the vacuum pump 20 via the inlet open/close valve 9 provided at the inlet gas communication tube 5 of another adsorption/ desorption column 4 through another adsorption/desorption column 4 and via the outlet gas communication tube 7 and the outlet open/close valve 11 provided in another adsorption/desorption column 4.

Further, each adsorption/desorption column 4 is connected to the ozone-using facility 17 and the vacuum pump 22 through the inlet gas communication tube 5, the inlet open/close valve 8, the vacuum pump 15, the flow rate adjusting unit 16, and the ozone concentration meter 29.

As described above, the apparatus for producing high-concentration ozone gas according to Embodiment 2 of the present invention includes an ozone generator 3 that generates ozone from oxygen, a plurality of adsorption/desorption columns 4 in which the silica gel 6 that is an ozone adsorbent cooled with the certain-temperature refrigerant 25 is packed so as to concentrate ozone generated by the ozone generator 3, a refrigerating machine 23 that is cooling means for cooling the refrigerant 25, the vacuum pump 20 connected to the adsorption/desorption columns 4 for discharging mainly oxygen from the silica gel 6 adsorbing the ozone, thereby concentrating the ozone in the adsorption/desorption columns 4, a plurality of open/close valves 8 to 13 for air pressure operations, connected to the adsorption/desorption columns 4, for switching passages of gas that is to flow in or flow out with respect to the adsorption/desorption columns 4, and ozone concentration meters 28, 29 for measuring the concentration of the ozone concentrated by the vacuum pump 20, in which a discharge line of the vacuum pump 20 that concentrates the ozone in one of the adsorption/desorption columns 4 in which the silica gel 6 is packed is allowed to pass through another one of the adsorption/desorption columns 4 again. In this configuration, the three adsorption/desorption columns 4 repeatedly perform the adsorption step of adsorbing ozone, the vacuum discharging step of discharging adsorbed ozone in vacuum to enhance the concentration of ozonized gas, and the ozone desorption step of sending out the concentrated ozone, thereby adsorbing ozone again, the concentration of which does not reach a predetermined concentration and which used to be discarded conventionally. Thus, ozone is concentrated to a predetermined ozone concentration in a range of 30 to 100 vol %, required by an ozone-using facility, and can be used.

Next, the operation of the apparatus for producing high-concentration ozone gas according to Embodiment 2 of the present invention is described. Oxygen is fed in the ozone generator 3 from the oxygen bomb 1 to generate ozone. The ozone is first placed in the adsorption/desorption column 4-1 through the inlet open/close valve 10-1 and the inlet gas communication tube 5-1, and is adsorbed by the silica gel 6-1 in the adsorption/desorption column 4-1 cooled via the refrigerant 25 cooled by the refrigerating machine 23. The gas having adsorbed the ozone and a part of oxygen is released to the atmosphere through the outlet gas communication tube 7-1, the outlet open/close valve 13-1, the pressure controller (APC) 18, the ozone concentration meter 28, and the ozone-decomposing catalyst 19. As the partial pressure of ozone is higher, the gas adsorbs the ozone more. Therefore, during ozone adsorption, a gauge pressure is adjusted to 0.1 MPa or more by the pressure controller (APC) 18. After the completion of the adsorption, the inlet open/close valve 10-1 and the outlet open/close valve 13-1 are closed. Then, the inlet open/close valve 10-2 and the outlet open/close valve 13-2 provided with respect to the adsorption/desorption column 4-2 are opened, whereby the silica gel 6-2 in the adsorption/desorption column 4-2 is allowed to adsorb ozone.

The silica gel 6-1 simultaneously adsorbs oxygen together with ozone. The adsorbed oxygen is discharged from the silica gel 6-1 with the vacuum pump 20 via the outlet open/close valve 12-1, whereby ozone is concentrated. When the oxygen is discharged, the ozone is discharged simultaneously together with the oxygen. Therefore, the ozone discharged from the adsorption/desorption column 4-1 is adsorbed in the adsorption/desorption column 4-2 through the outlet open/close valve 12-1, the vacuum pump 20, the inlet open/close valve 9-2, and the inlet gas communication tube 5-2. Thus, ozone flows through the vacuum pump 20, which makes it necessary that the vacuum pump 20 has high corrosion resistance to ozone, and hence, a vacuum pump using a diaphragm made of Teflon (Registered Trademark) is used. The concentration of ozone leaking from the adsorption/desorption column 4-1 is monitored by the ozone concentration meter 28, and the evacuation start time of the adsorption/desorption column 4-1 is previously set so that the breakthrough of the high-purity silica gel 6-2 in the measured adsorption/desorption column 4-2 and the achievement of a predetermined concentration in the adsorption/desorption column 4-1 are completed simultaneously. When the ozone in the adsorption/desorption column 4-1 achieves the predetermined concentration, the inlet open/close valve 8-1 is opened, the flow rate is controlled to be constant by the flow rate adjuster 16 through the vacuum pump 15, and the ozone, which has a predetermined concentration that is previously set in a range of 30 to 100 vol % required by the ozone-using facility 17, is sent to the ozone-using facility 17 that is in a reduced pressure state by the vacuum pump 22 through the ozone concentration meter 29. Table 1 illustrates a series of adsorption, reduction in pressure, and desorption and the operation of each open/close valve.

TABLE 1

|  | 30 minutes | 30 minutes | 30 minutes | 30 minutes | 30 minutes | 30 minutes | 30 minutes |
| --- | --- | --- | --- | --- | --- | --- | --- |
| Column 4-1 | Adsorption | Suspension | Reduction in pressure | Desorption | Desorption | Adsorption | Adsorption |
| Column 4-2 | Suspension | Adsorption | Adsorption | Suspension | Reduction in pressure | Desorption | Desorption |
| Column 4-3 | Suspension | Suspension | Suspension | Adsorption | Adsorption | Suspension | Reduction in pressure |
| Valve 10-1, 13-1 | Open | Closed | Closed | Closed | Closed | Open | Open |
| Valve 10-2, 13-2 | Closed | Open | Open | Closed | Closed | Closed | Closed |

TABLE 1-continued

| | | | | | | | |
|---|---|---|---|---|---|---|---|
| Valve 10-3, 13-3 | Closed | Closed | Closed | Open | Open | Closed | Closed |
| Valve 12-1, 9-2, 11-2 | Closed | Closed | Open | Closed | Closed | Closed | Closed |
| Valve 12-2, 9-3, 11-3 | Closed | Closed | Closed | Closed | Open | Closed | Closed |
| Valve 12-3, 9-1, 11-1 | Closed | Closed | Closed | Closed | Closed | Closed | Open |
| Valve 8-1 | Closed | Closed | Closed | Open | Open | Closed | Closed |
| Valve 8-2 | Closed | Closed | Closed | Closed | Closed | Open | Open |
| Valve 8-2 | Closed | Closed | Closed | Closed | Closed | Closed | Closed |

| | | | | | | |
|---|---|---|---|---|---|---|
| | 30 minutes | 30 minutes | 30 minutes | 30 minutes | 30 minutes | 30 minutes |
| Column 4-1 | Suspension | Reduction in pressure | Desorption | Desorption | Adsorption | Adsorption |
| Column 4-2 | Adsorption | Adsorption | Suspension | Reduction in pressure | Desorption | Desorption |
| Column 4-3 | Desorption | Desorption | Adsorption | Adsorption | Suspension | Reduction in pressure |
| Valve 10-1, 13-1 | Closed | Closed | Closed | Closed | Open | Open |
| Valve 10-2, 13-2 | Open | Open | Closed | Closed | Closed | Closed |
| Valve 10-3, 13-3 | Closed | Closed | Open | Open | Closed | Closed |
| Valve 12-1, 9-2, 11-2 | Closed | Open | Closed | Closed | Closed | Closed |
| Valve 12-2, 9-3, 11-3 | Closed | Closed | Closed | Open | Closed | Closed |
| Valve 12-3, 9-1, 11-1 | Closed | Closed | Closed | Closed | Closed | Open |
| Valve 8-1 | Closed | Closed | Open | Open | Closed | Closed |
| Valve 8-2 | Closed | Closed | Closed | Closed | Open | Open |
| Valve 8-2 | Open | Open | Closed | Closed | Closed | Closed |

Figure 5:
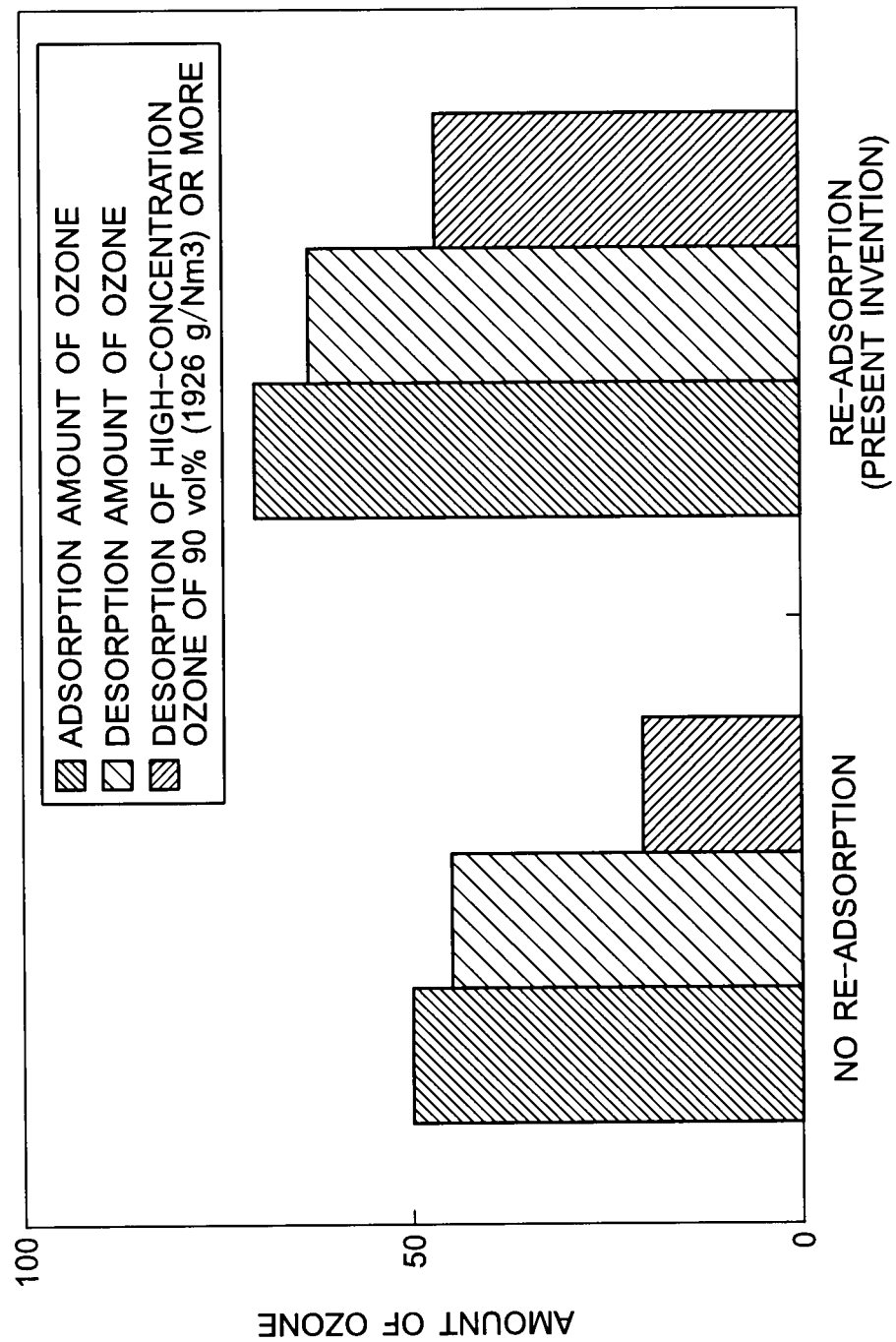
[FIG. 5] An explanatory view graphically illustrating the comparison between the amount of ozone generated by the apparatus for producing high-concentration ozone gas according to Embodiment 2 of the present invention and the conventional amount.

FIG. 5 is a graph illustrating the ozone adsorption amount, the amount of desorbed ozone, and the amount of ozone of a concentration of 90 vol % or more in the desorbed ozone, when the temperature of the refrigerant 25 is set to be constant at −60° C. as an example. In the figure, three bars on the left side illustrate the case where ozone is not adsorbed again, and three bars on the right illustrate the case where ozone is adsorbed again according to Embodiment 1. In each case, the bar at the left represents the ozone adsorption amount, the center bar represents the ozone desorption amount, and the bar at the right illustrates the value of the desorption amount of concentrated ozone of 90 vol % or more.

Thus, in the embodiment, ozone, which used to be discharged conventionally and the concentration of which has not reached a product gas concentration, is placed in another adsorption/desorption column 4 and adsorbed again, whereby the adsorption amount of ozone increases, the power for ozone generation due the increase in use efficiency of ozone decreases, and gas of high ozone partial pressure can be adsorbed. Therefore, silica gel is allowed to adsorb ozone at a high density, which facilitates the concentration of ozone. In Embodiment 2, in the case where there is a sufficient room for a discharge amount and a vacuum achievement of the vacuum pump 22, even if the vacuum pump 15 is eliminated, the vacuum pump 22 belonging to the ozone-using facility 17 is used, and the adsorption/desorption in the adsorption/desorption column 4 is performed, the same effects can be exhibited. Further, the configuration of three columns has been described above. However, three units may be switched with a plurality of columns being set to be one unit in order to obtain the same effects. The remaining operation is the same as that of Embodiment 1 described above, and hence the illustration and the description thereof is omitted here.

As described above, in the apparatus for producing high-concentration ozone gas according to this embodiment, ozone generated by the ozone generator is adsorbed by the silica gel 6-1 packed in the adsorption/desorption column 4-1 cooled by the refrigerating machine 23. After that, the ozone is discharged through the vacuum pump 20 and the gas discharged by the vacuum pump 20 is distributed through the communicated ozone adsorption/desorption column 4-2 through which the ozonized gas breaks. Therefore, the following effects are obtained.

First, it is not necessary to heat silica gel by taking out ozonized gas concentrated through the vacuum pump at a certain temperature, and hence the energy and time for heating can be saved. Second, the adsorption/desorption column through which ozone breaks is allowed to adsorb ozonized gas of high concentration discharged in vacuum from the adsorption/desorption column. Therefore, the use efficiency of ozone is enhanced and the concentration ratio is increased, which allows to save the generation amount of ozone, and reduce the energy for generating ozone. Third, the discharge line of the vacuum pump is connected to another adsorption/desorption column in the adsorption process. Therefore, the adsorption rate and adsorption amount are proportional to the ozone concentration, and hence, ozone of high concentration coming out of the discharge line of the vacuum pump is adsorbed, whereby the adsorption is fast, and ozone of concentration higher than that of ozone generated from the ozone generator can be adsorbed, whereby the adsorption amount can be increased.

Further, in the configuration illustrated in FIG. 4, the main adsorption/desorption column group may be formed of the adsorption/desorption columns 4-1, 4-2, and 4-3, and the auxiliary adsorption/desorption column 999 illustrated in Embodiment 1 may further be provided. In this case, needless to say, the same effects as those in Embodiment 1 are obtained.

Embodiment 3

Figure 6:
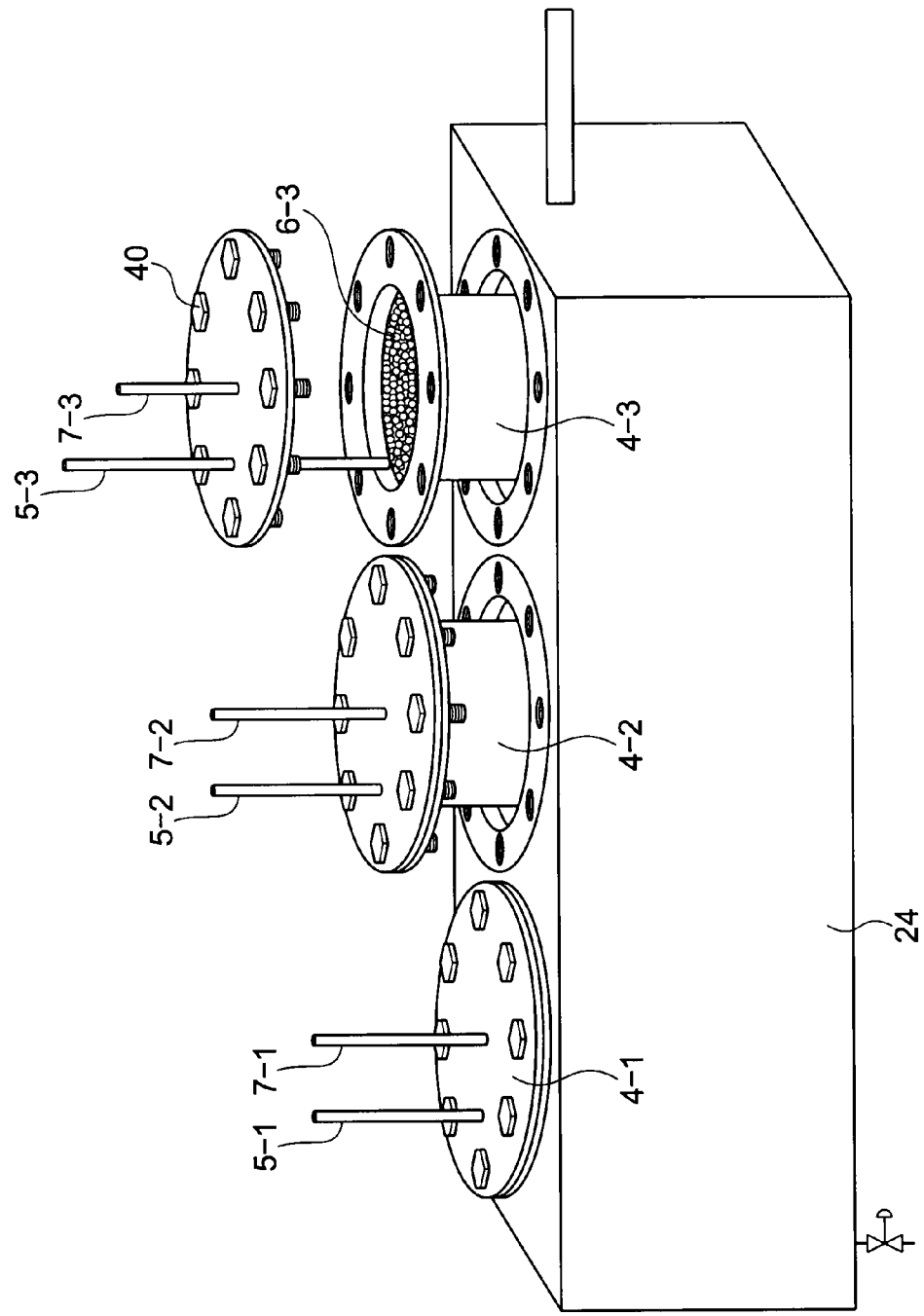
[FIG. 6] A partial perspective view illustrating main portions of an apparatus for producing high-concentration ozone gas to Embodiment 3 of the present invention.

FIG. 6 is a view illustrating an apparatus for producing high-concentration ozone gas according to Embodiment 3 of the present invention. The inlet gas communication tube 5 and the outlet gas communication tube 7 are inserted in the adsorption/desorption columns 4-1 to 4-3 from above, the inlet gas communication tube 5 penetrates the high-purity silica gel 6 to a lower portion thereof, and gas introduction ports and gas discharge ports of the communication tubes 5 and 7 are placed with the high-purity silica gel 6 interposed therebetween. The adsorption/desorption columns 4-1 to 4-3 are attached to the cooling tank 24 with a plurality of bolts 40. Further, although not shown, the adsorption/desorption columns 4-4 illustrated in FIG. 2 of Embodiment 1 as described above is also provided. Further, the respective upper ends of the inlet gas communication tube 5 and the outlet gas communication tube 7 outside the adsorption/desorption column 4 are placed on the same side of the adsorption/desorption column 4, and the lower ends placed inside the adsorption/desorption column 4 sandwich the silica gel 6, and hence, ozonized gas is likely to be adsorbed. Further, the adsorption/desorption column 4 and the cooling tank 24 can be separated. Therefore, the adsorption/desorption column 4 can be exchanged without discharging a refrigerant 25 from the cooling tank 24. Thus, the weight of the entire apparatus for producing ultra-high-concentration ozone becomes small, and only the adsorption/desorption column 4 can be attached/detached, which facilitates maintenance. The remaining configuration is the same as that of Embodiment 1 described above, and hence the illustration and the description thereof is omitted here.

Figure 7:
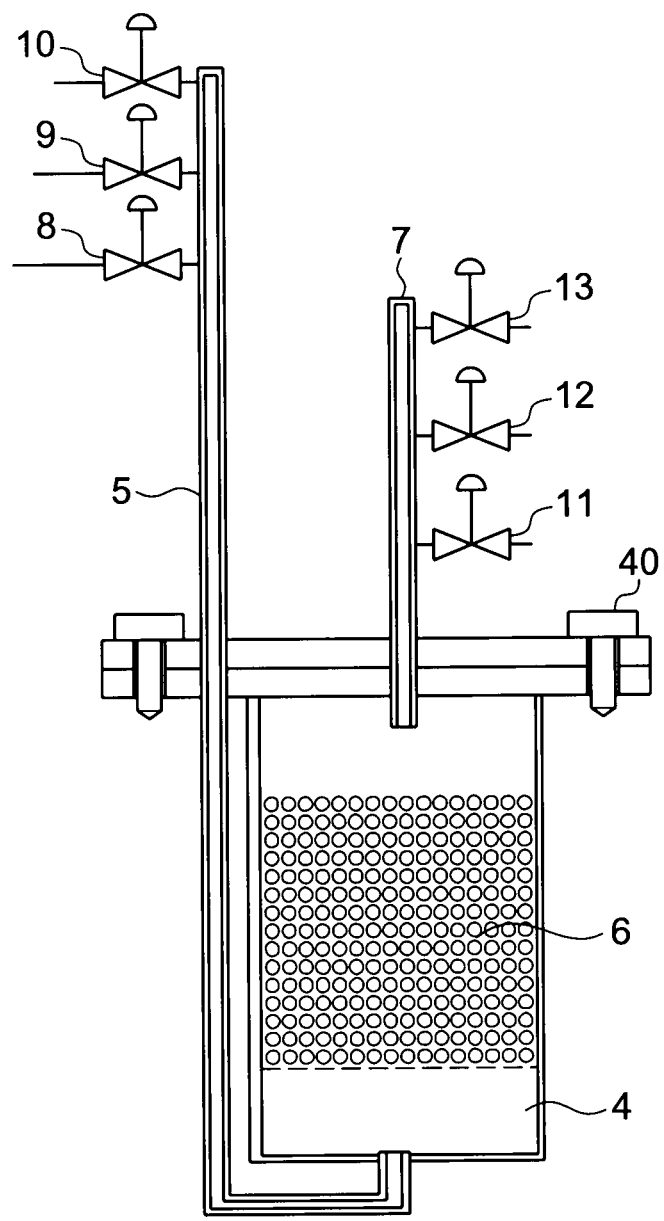
[FIG. 7] A partial cross-sectional view illustrating main portions of the apparatus for producing high-concentration ozone gas r according to Embodiment 3 of the present invention.

In Embodiment 3, although an example has been described in which the inlet gas communication tube 5 penetrates the silica gel 6, the present invention is not limited thereto. The inlet gas communication tube 5 passes through the outside of the adsorption/desorption column 4 to sandwich the outlet gas communication tube 7 and the silica gel 6, as illustrated in FIG. 7, and the same effects can be obtained even in this case.

As described above, according to Embodiment 3, the adsorption/desorption columns 4-1 to 4-3 are attached to the cooling tank 24 with the bolts 40, and hence the adsorption/desorption column 4 and the cooling tank 24 can be separated from each other. Therefore, the adsorption/desorption column 4 can be exchanged without pulling the refrigerant 25 from the cooling tank 24, and only the adsorption/desorption column 4 can be attached/detached, which facilitates maintenance.

Embodiment 4

Figure 8:
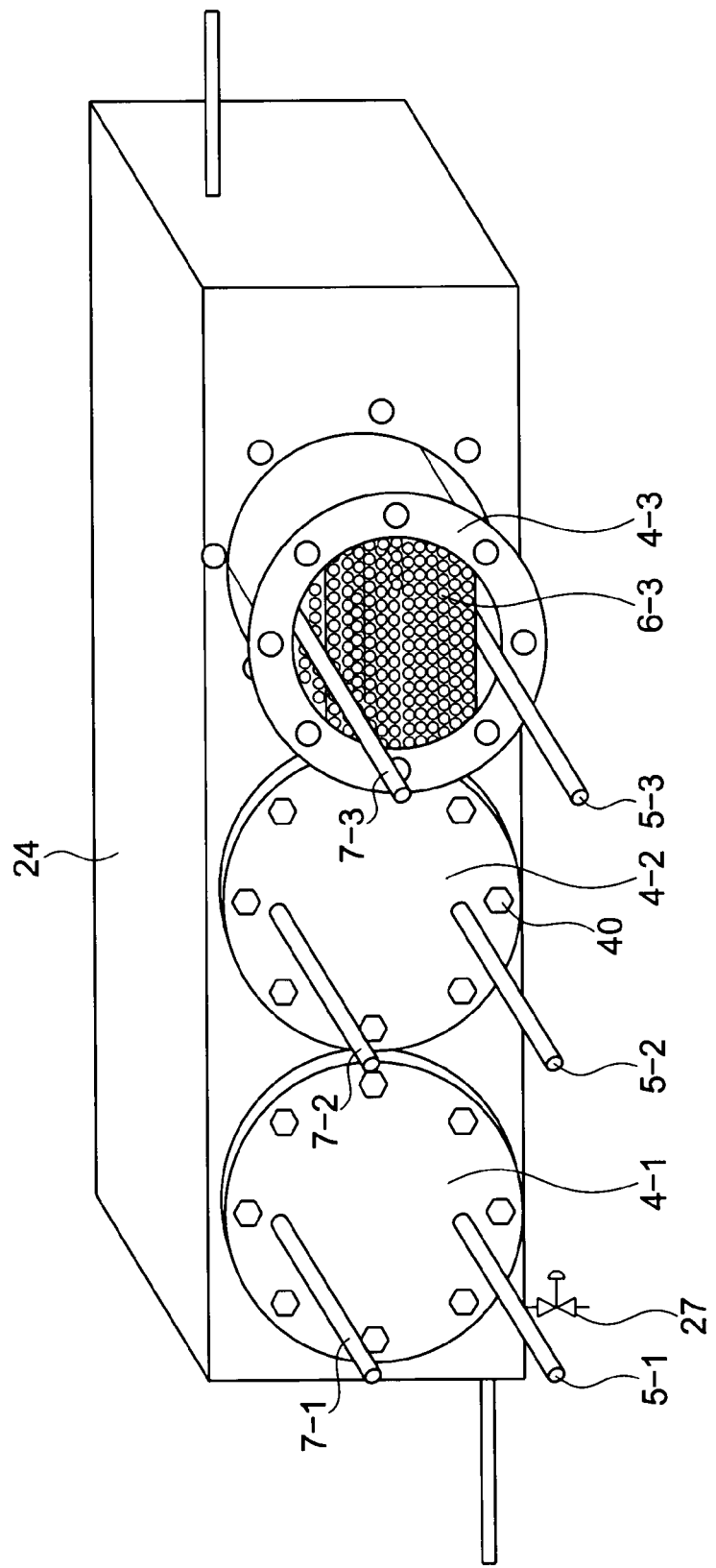
[FIG. 8] A partial perspective view illustrating main portions of an apparatus for producing high-concentration ozone gas according to Embodiment 4 of the present invention.

FIG. 8 is a view illustrating an apparatus for producing high-concentration ozone gas according to Embodiment 4 of the present invention. As illustrated in FIG. 8, the adsorption/desorption column 4 is inserted so as to be directed horizontally in the cooling tank 24 from a side surface of the cooling tank 24 and attached to the side surface of the cooling tank 24 with bolts 40. The configuration of the adsorption/desorption column 4 itself is basically the same as those illustrated in Embodiments 1 to 3. Further, although not shown, actually, it is assumed that the adsorption/desorption column 4-4 illustrated in FIG. 2 is also provided even in this embodiment.

However, in this embodiment, the adsorption/desorption column 4 is placed horizontally, and hence, the silica gel 6 is positioned in a center portion in a height direction (including a diameter in a horizontal direction) in the adsorption/desorption column 4, and is placed while gaps are provided only in upper and lower portions in the adsorption/desorption column 4. In the center portion (excluding the gaps), the silica gel 6 is in close contact with the inner wall of the adsorption/desorption column 4. Further, the outlet gas communication tube 7 is inserted in the gap in the upper portion in the adsorption/desorption column 4, and the inlet gas communication tube 5 enters through the gap in the lower portion in the adsorption/desorption column 4 so that its tip end is set in the center portion in a depth direction, whereby the silica gel 6 is allowed to adsorb/desorb ozone. The remaining configuration is the same as that in Embodiment 1 described above, and hence, the illustration and the description thereof is omitted here.

Thus, the adsorption/desorption column 4 be capable of functioning in the same way as in Embodiment 1 even provided horizontally. However, in this embodiment, the adsorption/desorption column 4 is inserted in the side surface of the cooling tank 24, while being directed horizontally, and hence the refrigerant 25 spills during maintenance. Therefore, the refrigerant 25 is previously discharged from the cooling tank 24 with a drain open/close valve 27 attached to the cooling tank 24, whereby the adsorption/desorption column 4 is replaced. The remaining operation is the same as that in Embodiment 1 described above, and hence, the description thereof is omitted here.

As described above, in Embodiment 4, the adsorption/desorption column 4 is attached from the side surface of the cooling tank 24, and hence it is not necessary to take a maintenance space in the upper portion of the adsorption/desorption column 4, which can facilitate maintenance.

Embodiment 5

Figure 9:
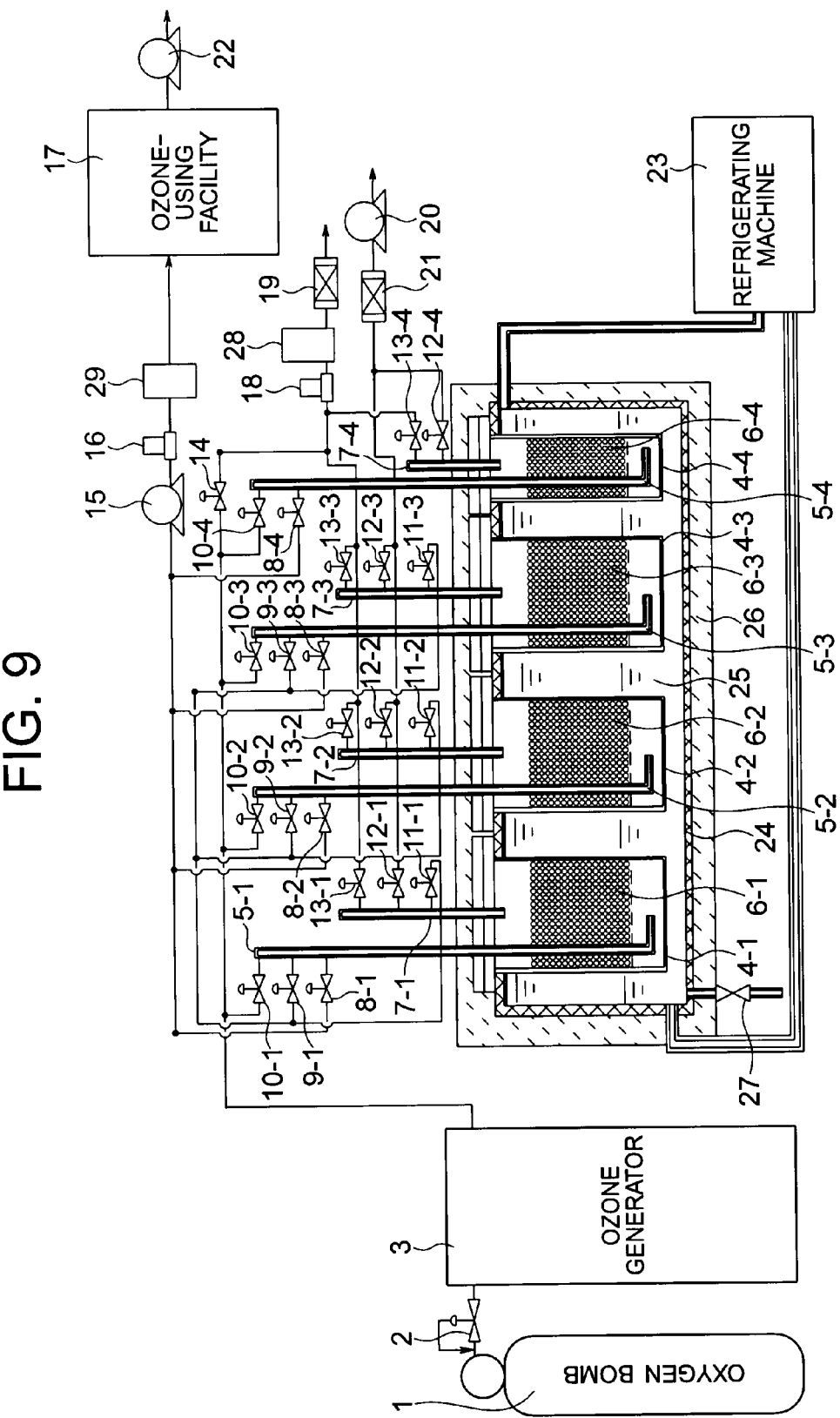
[FIG. 9] A structural view illustrating a configuration of an apparatus for producing high-concentration ozone gas according to Embodiment 5 of the present invention.
Figure 10:
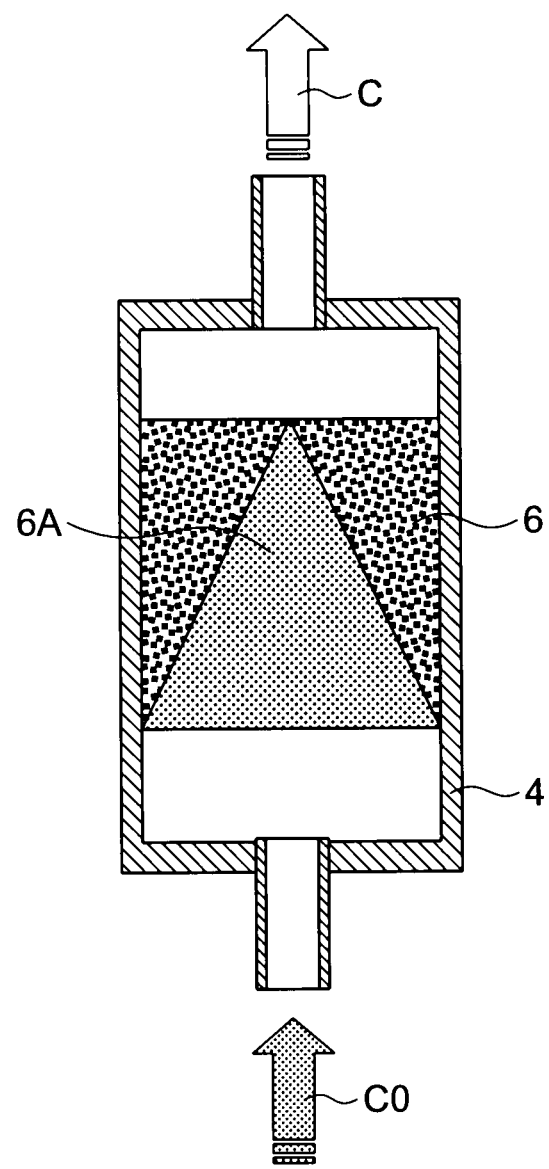
[FIG. 10] A schematic structural view illustrating the configuration of an adsorption/desorption column of an adsorption/desorption system prior to the present invention.
Figure 11:
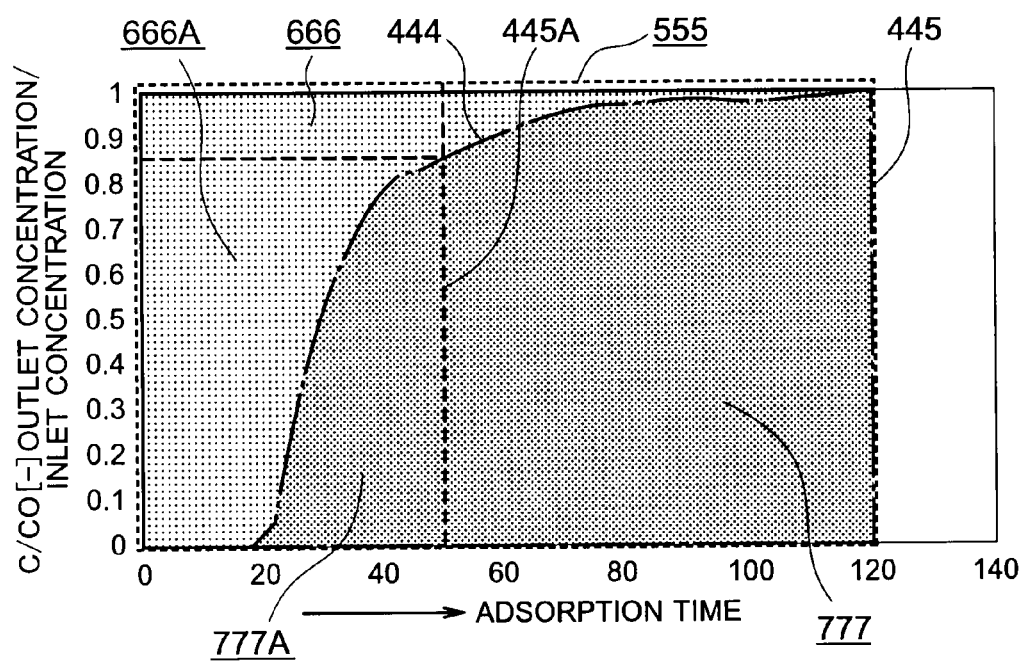
[FIG. 11] A view illustrating a characteristic view illustrating adsorption characteristics of ozonized gas of the adsorption/desorption column, the amount of supply ozone, the amount of adsorbed ozone, and the amount of discharged ozone.

FIG. 9 is a view illustrating an apparatus for producing high-concentration ozone gas according to Embodiment 5 of the present invention. In addition to the three adsorption/desorption columns 4-1, 4-2, and 4-3 of the same size, the fourth adsorption/desorption column 4-4, which is smaller than the three adsorption/desorption columns 4-1, 4-2, and 4-3, is provided. The inlet gas communication tube 5-4 and the outlet gas communication tube 7-4 are inserted in the adsorption/desorption column 4-4 in the same way as in the adsorption/desorption columns 4-1, 4-2, and 4-3. Further, two inlet open/close valves 8-4 and 10-4 are provided at the inlet gas communication tube 5-4, and two outlet open/close valves 12-4 and 13-4 are provided at the outlet gas communication tube 7-4.

The four adsorption/desorption columns 4 are provided in the cooling tank 24 covered with the heat-insulating material 26. Further, the silica gel 6 is placed in the four adsorption/desorption columns 4, which are connected so as to adsorb ozone serially with the ozone generator 3, the inlet open/close valve 10, the outlet open/close valve 13, the pressure controller (APC) 18, an ozone concentration meter 28, and the ozone-decomposing catalyst 19. The adsorption/desorption column 4-1 is connected to the adsorption/desorption column 4-2 through the outlet open/close valve 11-1 and the inlet open/close valve 9-2, and is connected to the vacuum pump 20 through the open/close valve 12-2 and the ozone-decomposing catalyst 21. Similarly, the adsorption/desorption column 4-2 is connected to the adsorption/desorption column 4-3 through the outlet open/close valve 11-2 and the inlet open/close valve 9-3, and is connected to the vacuum pump 20 through the outlet open/close valve 12-3 and the ozone-decomposing catalyst 21. The adsorption/desorption column 4-3 is connected to the adsorption/desorption column 4-1 through the outlet open/close valve 11-3 and the inlet open/close valve 9-1, and is connected to the vacuum pump 20 through the open/close valve 12-1 and the ozone-decomposing catalyst 21. The adsorption/desorption column 4-4 is connected to the vacuum pump 20 through the outlet open/close valve 12-4 and the ozone-decomposing catalyst 21. Further, the adsorption/desorption columns 4 are connected to the ozone-using facility 17 and the vacuum pump 22 through the inlet open/close valve 8, the vacuum pump 15, the mass-flow controller 16, and the ozone concentration meter 29. Further, the refrigerant 25 cooled by the refrigerating machine 23 circulates in the cooling tank 24. The remaining configuration is the same as that of Embodiments 1 to 4 described above.

Next, description is made of the operation. Oxygen is fed in the ozone generator 3 from the oxygen bomb 1 to generate ozone. The ozone is adsorbed through the inlet open/close valve 10-1 and the communication tube 5-1 by the silica gel 6-1 cooled via the refrigerant 25 by the refrigerating machine 23. The gas having adsorbed the ozone and a part of oxygen is released to the atmosphere through the outlet gas communication tube 7-1, the outlet open/close valve 13-1, the pressure controller (APC) 18, the automatic concentration meter 28, and the ozone-decomposing catalyst 19. As the partial pressure of ozone is higher, the ozone is adsorbed more. Therefore, during ozone adsorption, a gauge pressure is adjusted to 0.1 MPa or more by the pressure controller (APC) 18. After the completion of adsorption, the inlet open/close valve 10-1 and the outlet open/close valve 13-1 are closed, and the inlet open/close valve 10-4 and the outlet open/close valve 13-4 are opened, whereby the adsorption/desorption column 4-4 is allowed to adsorb ozone. Simultaneously, the outlet open/close valve 11-1, the inlet open/close valve 9-2, and the outlet open/close valve 12-2 are opened, and vacuum discharging is performed with the vacuum pump 20, whereby ozone in the adsorption/desorption column 4-1 is concentrated. At this time, the adsorption/desorption column 4-2 adsorbs oxygen and ozone discharged simultaneously, and only oxygen from the outlet open/close valve 12-2 is discharged. In the series of operations, when the concentration of ozone in the adsorption/desorption column 4-1 reaches a predetermined concentration, the outlet open/close valve 11-1, the inlet open/close valve 9-2, and the outlet open/close valve 12-2 are closed, and the inlet open/close valve 8-1 is opened, whereby ozonized gas with a flow rate controlled by the mass-flow controller 16 is sent to the ozone-using facility 17 through the vacuum pump 15. At this time, the inlet open/close valve 9-2 and the outlet open/close valve 13-2 are opened, and the inlet open/close valve 9-4 and the outlet open/close valve 13-4 are closed, whereby the adsorption/desorption column 4-2 is allowed to adsorb ozonized gas generated by the ozone generator 3. The concentration of ozonized gas adsorbed by the adsorption/desorption column 4-4 increases when the open/close valve 12-4 is opened, and oxygen is discharged through the vacuum pump 20 with the ozone-decomposing catalyst 21. When the concentration reaches a predetermined concentration previously set in a range of 30 to 100 vol % required by the ozone-using facility, the inlet open/close valve 8-4 is opened, and the ozonized gas is sent to the ozone-using facility 17 simultaneously with ozonized gas of ultra-high concentration coming out of the adsorption/desorption column 4-1. Table 2 illustrates a series of adsorption, reduction in pressure, generation of ozone of ultra-high concentration and the operation of each open/close valve.

TABLE 2

| | 20 minutes | 20 minutes | 20 minutes | 20 minutes | 20 minutes | 20 minutes | 20 minutes |
|---|---|---|---|---|---|---|---|
| Column 4-1 | Adsorption | Adsorption | Adsorption | Reduction in pressure | Desorption | Desorption | Desorption |
| Column 4-2 | Suspension | Suspension | Suspension | Adsorption of gas reduced in pressure | Adsorption | Adsorption | Adsorption |
| Column 4-3 | Suspension | Suspension | Suspension | Suspension | Suspension | Suspension | Suspension |
| Column 4-4 | Suspension | Suspension | Suspension | Adsorption | Reduction in pressure | Desorption | Suspension |

TABLE 2-continued

| | | | | | | | |
|---|---|---|---|---|---|---|---|
| Valve 10-1, 13-1 | Open | Open | Open | Closed | Closed | Closed | Closed |
| Valve 10-2, 13-2 | Closed | Closed | Closed | Closed | Open | Open | Open |
| Valve 10-3, 13-3 | Closed | Closed | Closed | Closed | Closed | Closed | Closed |
| Valve 10-4, 13-4 | Closed | Closed | Closed | Open | Closed | Closed | Closed |
| Valve 11-1, 9-2, 12-2 | Closed | Closed | Closed | Open | Closed | Closed | Closed |
| Valve 11-2, 9-3, 12-3 | Closed | Closed | Closed | Closed | Closed | Closed | Closed |
| Valve 11-3, 9-1, 12-1 | Closed | Closed | Closed | Closed | Closed | Closed | Closed |
| Valve 12-4 | Closed | Closed | Closed | Closed | Open | Closed | Closed |
| Valve 8-1 | Closed | Closed | Closed | Closed | Open | Open | Open |
| Valve 8-2 | Closed | Closed | Closed | Closed | Closed | Closed | Closed |
| Valve 8-3 | Closed | Closed | Closed | Closed | Closed | Closed | Closed |
| Valve 8-4 | Closed | Closed | Closed | Closed | Closed | Open | Closed |
| | 20 minutes | 20 minutes | 20 minutes | 20 minutes | 20 minutes | 20 minutes | 20 minutes |
| Column 4-1 | Desorption | Suspension | Suspension | Suspension | Adsorption of gas reduced in pressure | Adsorption | Adsorption |
| Column 4-2 | Reduction in pressure | Desorption | Desorption | Desorption | Desorption | Suspension | Suspension |
| Column 4-3 | Adsorption of gas reduced in pressure | Adsorption | Adsorption | Adsorption | Reduction in pressure | Desorption | Desorption |
| Column 4-4 | Adsorption | Reduction in pressure | Desorption | Suspension | Adsorption | Reduction in pressure | Desorption |
| Valve 10-1, 13-1 | Closed | Closed | Closed | Closed | Closed | Open | Open |
| Valve 10-2, 13-2 | Closed | Closed | Closed | Closed | Closed | Closed | Closed |
| Valve 10-3, 13-3 | Closed | Open | Open | Open | Closed | Closed | Closed |
| Valve 10-4, 13-4 | Open | Closed | Closed | Closed | Open | Closed | Closed |
| Valve 11-1, 9-2, 12-2 | Closed | Closed | Closed | Closed | Closed | Closed | Closed |
| Valve 11-2, 9-3, 12-3 | Open | Closed | Closed | Closed | Closed | Closed | Closed |
| Valve 11-3, 9-1, 12-1 | Closed | Closed | Closed | Closed | Open | Closed | Closed |
| Valve 12-4 | Closed | Open | Closed | Closed | Closed | Open | Closed |

TABLE 2-continued

| | | | | | | | |
|---|---|---|---|---|---|---|---|
| Valve 8-1 | Open | Closed | Closed | Closed | Closed | Closed | Closed |
| Valve 8-2 | Closed | Open | Open | Open | Open | Closed | Closed |
| Valve 8-3 | Closed | Closed | Closed | Closed | Closed | Open | Open |
| Valve 8-4 | Closed | Closed | Open | Closed | Closed | Closed | Open |

In Embodiment 2 described above, ozonized gas discharged under reduced pressure and gas generated by the ozone generator 3 are adsorbed simultaneously. Therefore, ozonized gas discharged under reduced pressure is diluted slightly. On the other hand, as in Embodiment 4, by providing the auxiliary adsorption/desorption column 4-4 and allowing the adsorption/desorption column 4-4 to adsorb the ozonized gas discharged under reduced pressure and the ozonized gas generated by the ozone generator 3, the ozone partial pressure when ozonized gas discharged under reduced pressure is adsorbed again increases, and hence the adsorption amount increases. Further, the auxiliary added adsorption/desorption column 4-4 performs the step of adsorption, reduction in pressure and generation of ozone of ultra-high concentration in one column while the other three columns repeat the step of adsorption, reduction in pressure, and generation of ozone of ultra-high concentration. Therefore, the capacity of the adsorption/desorption column, i.e., the amount of silica gel may be ⅓. The remaining operation is the same as that of Embodiment 1 described above, and hence the illustration and the description thereof is omitted here.

As described above, according to Embodiment 5, ozone, which used to be discharged conventionally and the concentration of which has not reached a product gas concentration, is placed in another adsorption/desorption column and adsorbed again, whereby the use efficiency of ozone is enhanced. Further, ozone contained in discharge gas is adsorbed by the silica gel 6, and hence, the vacuum pump 20 does not touch ozone, and the ozone-decomposing catalyst 21 with low performance can be used, whereby a safe apparatus for producing high-concentration ozone gas of high reliability can be realized. Further, four adsorption/desorption columns in total are provided: three adsorption/desorption columns that repeatedly perform the adsorption step of adsorbing ozone, the vacuum discharging step of discharging adsorbed ozone in vacuum to enhance the concentration of ozonized gas, and the ozone generation step of sending out the generated ozone; and one adsorption/desorption column that performs the adsorption step, the vacuum discharging step, and the ozone adsorption/desorption step independently from the above-mentioned adsorption/desorption columns are provided. Therefore, the ozonized gas discharged in vacuum is not diluted, and hence an adsorbent is allowed to adsorb ozone at a higher density. Thus, the use efficiency of ozone is enhanced and the power for generating ozone can be reduced.

Further, even in this embodiment, as illustrated in the timing chart of FIG. 3, if high-concentration ozone is controlled to be output to the outside from the adsorption/desorption column 4-4 during a period in which the desorption step is not performed by any of the adsorption/desorption columns 4-1, 4-2, and 4-3 in the same way as in Embodiment 1, needless to say, the effect that high-concentration ozone gas can be output continuously can be further obtained in the same way as in Embodiment 1.

Further, in Embodiment 5, although the configuration of providing four adsorption/desorption columns has been described, the present invention is not limited thereto. Three units with a plurality of columns being one unit and the fourth unit with less number of columns may be used, and even in this case, the same effects as those in the above can be obtained.

Although the apparatus of the present invention has been made for the purpose of the continuous output of high-concentration ozone gas, it also has the effect of outputting high-concentration ozone gas in a large flow rate even in the case where ozone gas is output intermittently. Thus, this system is effective.

The gas from the oxygen bomb 1 used in the ozone generator 3 described in Embodiments 1 to 5 is desirably pure oxygen with a purity of 99.99% or more, for example. When oxygen containing no nitrogen is used as a material gas for generating ozone, a nitrogen oxide is not contained in generated ozone, and hence, corrosion is not caused in an ozone-using facility.

Further, it is desired to use, as silica gel used for adsorbing ozone, silica gel in which the purity of silica (chemical symbol $SiO_2$) is 99.9% or more. This prevents ozone from being decomposed and lost due to the reaction with impurities (particularly, metal components) contained in silica gel, and impurities generated from silica gel can be prevented from being mixed in the generated ozone.

The apparatus for producing high-concentration ozone gas and the method of producing high-concentration ozone gas of the present invention are mainly used in an apparatus for increasing the concentration of ozonized gas during an oxide film formation step and a washing step in the semiconductor production field. However, the present invention is not limited to this case, and is also important as a method for storing ozone in the field of desorbing adsorbed ozonized gas for reuse. In the case of using the present invention as the method for storing ozone, ozone is generated by an ozone generator in a time zone in which the power rates are low at midnight, the generated ozone is stored in the apparatus for generating high-concentration ozone gas of the present invention, and the stored ozone is used for water supply and sewerage treatment facilities and chemical plants.

The conventional method for storing ozone has problems that, when ozone generated by the ozone generator is adsorbed and stored, the ozone adsorption efficiency is very low. However, if the method for adsorbing ozone of the present invention is used, ozone can be stored efficiently, and the merit of using electric power at midnight effectively is obtained. Further, in the present invention, it is necessary to output high-concentration ozonized gas, which requires a vacuum pressure-reducing step. However, in the case of reusing stored ozone, only two steps: the adsorption step (ozone storage step) and the desorption step (ozone output step) suffice, and hence, the ozone efficiency can be enhanced further in the case of using the apparatus for storing ozone.

As described above, the same effects as the above can be obtained even in the case of using the apparatus for producing high-concentration ozone gas and the method for producing high-concentration ozone gas of the present invention as an apparatus for storing ozone.

The invention claimed is:

1. An apparatus for producing high-concentration ozone gas, comprising:
   an ozone generator;
   a plurality of adsorption/desorption columns packed with an ozone adsorbent for adsorbing ozone of ozonized gas generated by the ozone generator;
   gas supply means for allowing the ozonized gas generated by the ozone generator to flow into the plurality of adsorption/desorption columns;
   discharging means for discharging oxygen from the ozone adsorbent that has adsorbed the ozone in the adsorption/desorption columns;
   output means for allowing the ozonized gas, a concentration of which is increased when the oxygen in the adsorption/desorption columns is discharged, to flow out of the adsorption/desorption columns; and
   a plurality of valves capable of switching opening/closing of the passage of gas which is allowed to flow into or flow out of the adsorption/desorption columns,
   wherein each of the adsorption/desorption columns performs:
   ozone adsorption processing of allowing the ozone adsorbent to adsorb ozonized gas which is generated by the ozone generator and has a predetermined concentration exceeding an atmospheric pressure;
   evacuation processing of discharging oxygen from the ozone adsorbent which has absorbed ozone; and
   desorption processing of outputting the ozonized gas that is highly concentrated with ozone being discharged therefrom by vacuum desorption or heating desorption,
   wherein at least two of the plurality of adsorption/desorption columns are placed in a serial cycle arrangement to constitute a main adsorption/desorption column group,
   wherein one or more of the plurality of adsorption/desorption columns other than the at least two of the plurality of adsorption/desorption columns is placed in parallel with the main adsorption/desorption column group to constitute an auxiliary adsorption/desorption column, and
   wherein, in a period in which none of the at least two of the plurality of adsorption/desorption columns of the main adsorption/desorption column group is performing desorption processing, the auxiliary adsorption/desorption column performs desorption processing.

2. An apparatus for producing high-concentration ozone gas according to claim 1, wherein at least three adsorption/desorption columns among the plurality of adsorption/desorption columns are placed in a serial cycle arrangement to constitute a main adsorption/desorption column group.

3. An apparatus for producing high-concentration ozone gas according to claim 1, wherein the ozone adsorption processing is performed in every at least two columns of the adsorption/desorption columns of the main adsorption/desorption column group placed in the serial cycle arrangement, the evacuation processing and the desorption processing are performed in every one adsorption/desorption column of the main adsorption/desorption column group, and the ozone adsorption processing, the evacuation processing, and the desorption processing are repeated in a cycle manner, whereby high-concentration ozonized gas is output.

4. An apparatus for producing high-concentration ozone gas according to claim 1, wherein a discharge line of the discharging means provided at one of the adsorption/desorption columns is connected to another one of the adsorption/desorption columns among the plurality of adsorption/desorption columns, and discharge gas to be discharged by the discharging means is allowed to pass through the another one of the adsorption/desorption columns again.

5. An apparatus for producing high-concentration ozone gas according to claim 1, wherein a discharge line of the discharging means provided at one of the adsorption/desorption columns is connected via the valves to another one of the adsorption/desorption columns that is performing the ozone adsorption processing among the plurality of adsorption/desorption columns.

6. An apparatus for producing high-concentration ozone gas according to claim 1, wherein the adsorption/desorption columns comprise:
   at least three adsorption/desorption columns that perform an adsorption processing of adsorbing ozone, an evacuation processing of discharging the adsorbed ozone in vacuum to enhance a concentration of ozonized gas, and a desorption processing of sending out the concentrated ozone; and
   one or more adsorption/desorption column that performs the ozone adsorption processing, the evacuation processing, and the desorption processing independently from the three adsorption/desorption columns.

7. An apparatus for producing high-concentration ozone gas according to claim 1, wherein each of the adsorption/desorption columns of the main adsorption/desorption column group is formed in a delta piping configuration via a predetermined valve A among the valves, as a piping system for supplying ozonized gas from an ozonized gas generator to an ozone supply port of each of the adsorption/desorption columns of the main adsorption/desorption column group, a parallel piping configuration is provided at each of the adsorption/desorption columns via a predetermined valve B among the valves, as a piping system that discharges discharge gas (oxygen gas) after the ozonized gas is adsorbed during an adsorption step period to the ozone output port of each of the adsorption/desorption columns of the main adsorption/desorption column group, a parallel piping configuration is provided at an ozone decomposer via a predetermined valve C among the valves and a pressure controller that adjusts a pressure in the adsorption/desorption columns, as a piping system for roughly evacuating the adsorption/desorption columns during a rough evacuation step, a parallel piping configuration is provided at the discharging means via a predetermined valve D among the valves, further, as a piping system for taking out high-concentration ozone during a desorption step, a parallel piping configuration for outputting concentrated ozonized gas is provided via a predetermined valve E among the valves, and the valves A, B, C, and D are opened/closed for each of the ozone adsorption/desorption columns so that the ozone adsorption processing of supplying ozonized gas and discharging the adsorbed ozonized gas in every two columns of the three columns that are delta-connected, the ozonized gas evacuation processing of evacuating only the adsorption/desorption column in a front stage that adsorbs ozonized gas in the ozone adsorption processing, and the desorption processing of taking out high-concentration ozone from the evacuated adsorption/desorption column are repeated in a time series, whereby high-concentration ozone-concentrated gas is output from each of the adsorption/desorption columns.

8. An apparatus for producing high-concentration ozone gas according to claim 1, wherein an ozone concentration of ozonized gas of a predetermined concentration to be supplied to the adsorption/desorption columns is set to 300 g/Nm3 or more, and an adsorption pressure in the adsorption/desorption columns is set to a range of 0.15 MPa(G) to 0.5 MPa(G), whereby an adsorption temperature in the adsorption/desorption columns is set to −70° C. or more.

9. An apparatus for producing high-concentration ozone gas according to claim 1, wherein an amount of ozonized gas or an amount of oxygen gas of ozonized gas obtained from the ozone generator is controlled by dilution or addition.

10. An apparatus for producing high-concentration ozone gas according to claim 1, wherein ozonized gas which is substantially free of nitrogen-based gas added thereto, in which an added amount of nitrogen or nitrogen oxide gas is 0.01% or less, is used as ozonized gas to be adsorbed in the adsorption/desorption columns.

11. A method of producing high concentration ozone gas, comprising:
the step of generating ozonized gas of a predetermined concentration C exceeding an atmospheric pressure from an ozone generator;
an ozone adsorption step of supplying the ozonized gas of the predetermined concentration C generated by the ozone generator to a plurality of at least four adsorption/desorption columns packed with an ozone adsorbent set to a low temperature, and allowing the ozone adsorbent to adsorb ozone of the ozonized gas selectively;
an evacuation step of discharging oxygen from the ozonized gas in the adsorption/desorption columns with discharging means so as to enhance a concentration of ozone in the adsorption/desorption columns; and
a desorption step of taking out the ozone adsorbed in the adsorption/desorption columns by vacuum desorption or heating desorption,
wherein the adsorption/desorption columns comprise a main adsorption/desorption column group in which at least three adsorption/desorption columns among the plurality of adsorption/desorption columns are placed in a serial cycle arrangement, and an auxiliary adsorption/desorption column placed in parallel with the main adsorption/desorption column group, and
during a period in which none of the three adsorption/desorption columns of the main adsorption/desorption column group is in the desorption step, the desorption step is performed in the auxiliary adsorption/desorption column, whereby high-concentration ozone is output.

12. A method of producing high-concentration ozone gas according to claim 11, wherein the ozone adsorption step is performed in every at least two adsorption/desorption columns of the main adsorption/desorption column group, the evacuation step and the desorption step are performed in every one adsorption/desorption column of the main adsorption/desorption column group, and the ozone adsorption step, the evacuation step, and the desorption step are repeated in a cycle manner, whereby high-concentration ozone is output.

* * * * *